United States Patent
Yamada

(10) Patent No.: US 6,454,356 B1
(45) Date of Patent: Sep. 24, 2002

(54) HEAD REST SUPPORT

(75) Inventor: Nobuo Yamada, Aichi-ken (JP)

(73) Assignee: Nihon Technica Co., Ltd., Aichi-Ken (JP)

( * ) Notice: Subject to any disclaimer, the term of this patent is extended or adjusted under 35 U.S.C. 154(b) by 0 days.

(21) Appl. No.: 09/763,179

(22) PCT Filed: Aug. 25, 1999

(86) PCT No.: PCT/JP99/04574

§ 371 (c)(1),
(2), (4) Date: Feb. 20, 2001

(87) PCT Pub. No.: WO00/10430

PCT Pub. Date: Mar. 2, 2000

(30) Foreign Application Priority Data

Aug. 25, 1998 (JP) .......................................... 10-238734
Nov. 20, 1998 (JP) .......................................... 10-330877

(51) Int. Cl.⁷ ................................................. B60N 2/48
(52) U.S. Cl. ....................................... 297/410; 297/391
(58) Field of Search .................................. 297/391, 410

(56) References Cited

U.S. PATENT DOCUMENTS

| 4,527,834 A | * | 7/1985 | Zyngier ..................... 294/410 |
| 4,844,545 A | * | 7/1989 | Ishii ............................ 297/410 |
| 4,854,642 A | * | 8/1989 | Vidwans et al. ............. 297/410 |
| 4,858,994 A | * | 8/1989 | Yamashita ................... 297/391 |
| 5,445,434 A | * | 8/1995 | Kohut .......................... 297/391 |
| 5,667,276 A | * | 9/1997 | Connelly et al. ............. 297/410 |
| 5,788,250 A | * | 8/1998 | Masters et al. .............. 297/410 |
| 5,816,658 A | * | 10/1998 | Wallis ......................... 297/410 |
| 5,992,939 A | * | 11/1999 | Gass et al. ................. 297/463.1 |
| 6,099,077 A | * | 8/2000 | Isaacson ..................... 297/410 |

FOREIGN PATENT DOCUMENTS

| JP | 60-60309 | 4/1985 |
| JP | 4-30930 | 7/1992 |
| JP | 4-30931 | 7/1992 |
| JP | 6-46551 | 6/1994 |
| JP | 8-84634 | 4/1996 |

* cited by examiner

Primary Examiner—Peter M. Cuomo
Assistant Examiner—Joseph Edell
(74) Attorney, Agent, or Firm—Sughrue Mion, PLLC

(57) ABSTRACT

A headrest support that absorbs impact occurring on the headrest in the direction of its height is provided with a spring structure formed vertically downward from a lower side of a lock piece retaining hole, which prevents the clattering of a tube body relative to a receptacle tube. Resin-made springs are formed between cutout grooves extending in an outer peripheral surface of the tube body substantially parallel in the up-down direction, which are easily assembled by a lock piece, the tube body and a spring.

3 Claims, 34 Drawing Sheets

HEAD REST SUPPORT

TECHNICAL FIELD

The invention relates to a headrest support and, more particularly, to a headrest support that supports a headrest at an upper end of a seatback.

BACKGROUND ART

As this type of headrest support, a headrest support shown in FIG. 34 is conventionally known.

A headrest stay 1 is a rod-like body protruded from a bottom surface of a headrest that is supported above a seatback. Wedge-shaped height adjustment grooves 1a are formed on a side surface of the headrest stay 1.

A headrest support 2 has a tube body 3 that is formed into a tubular shape into which the headrest stay 1 can be inserted, and that is received and supported by a not-shown square pipe-made receptacle tube fixed by welding to a frame of the seatback, and a metal-made lock plate 4 that is inserted into a portion of the tube body 3 that is closer to an upper end thereof in a direction perpendicular to the headrest stay 1.

The lock plate 4 has a through-hole 4a that is elongated so as not to impede insertion of the headrest stay 1. An end of the lock plate 4 is provided with a push-in operating portion 4b that is integrally formed from resin.

The tube body 3 is provided with springs 5, 5 that contact the push-in operating portion 4b and urge the push-in operating portion 4b in such a manner as to push it out. In order to prevent the lock plate 4 from falling apart despite reaction forces from the springs, a stopper pin 6 is inserted into the tube body 3 from above, extending in a direction perpendicular to the direction of insertion of the lock plate 4.

A slit 4c for insertion of the stopper pin 6 is formed on the side of the lock plate 4. The stopper pin 6 and the slit 4c restrict the movable range of the lock plate 4.

The movable range of the lock plate 4 has a positional relationship that when the lock plate 4 is pushed in against the springs 5, 5, the lock plate 4 does not interfere, with the headrest stay 1, and that when the lock plate 4 is pushed out by the springs 5, 5, an edge portion of the through-hole 4a slightly interferes with the headrest stay 1.

That is, during a normal stable state, the lock plate 4 is in a positional relationship that the lock plate 4 interferes with the headrest stay 1, and thus engages with a height adjustment groove 1a. When a push-in operation is performed by using the push-in operating portion 4b, the engagement is discontinued so that the headrest stay 1 becomes movable up and down.

An outer peripheral surface of the tube body 3 is provided with a generally rectangular tongue piece that is formed by forming a generally squared U-shaped groove, and that has, at its distal end side, a protrusion protruded outwards, and that has flexibility substantially in a direction of a diameter of the tube body 3. When the tube body 3 is placed in the receptacle tube, the protrusion formed on the distal end side of the tongue piece is pressed against an inner peripheral surface of the receptacle tube so as to prevent the tube body from clattering against the receptacle tube.

DISCLOSURE OF THE INVENTION

The above-described conventional headrest support has the following problems.

First, when the tube body is placed in the receptacle tube, an upper end site of the tube body is pressed against an opening end portion of the receptacle tube. Therefore, if an impact occurs on the headrest in a direction of a height, the impact cannot be absorbed.

Second, since the generally rectangular tongue piece formed in the outer peripheral surface of the tube body 3 is supported only at its lower side by the tube body, the tongue piece cannot be provided with a sufficient strength, and is poor in durability.

Third, during assembly of the headrest support, the headrest stay 1 must be inserted into the tube body 3 while the lock plate 4 is being pressed against the tube body 3. Thus, the assembly workability is not good.

The invention has been accomplished in view of the aforementioned problems. It is an object of the invention to provide a headrest support that is capable of absorbing an impact occurring on the headrest in a direction of a height, and that has a sufficient strength and allows an improvement in assembly workability.

To achieve the aforementioned object, the invention has a construction including: a tube body that is inserted into and supported by a receptacle tube disposed in a seatback, and that retains a headrest stay inserted therein, and that allows an adjustment of a height of the headrest stay; and a spring structure that is protruded from a distal end side of the tube body toward an opening end portion of the receptacle tube, and that urges the distal end side of the tube body to move away from the opening end portion of the receptacle tube, and that urges the distal end side of the tube body to move away from the opening end portion of the receptacle tube when the tube body is pushed down to a side; of the receptacle tube.

In the thus-constructed invention, the tube body is inserted in and supported by the receptacle tube disposed in the seatback, and supports the headrest stay inserted therein, and adjusts the height of the headrest stay.

When the tube body is pushed down to a side of the receptacle tube, the spring structure protruded from the distal end side of the tube body toward the opening end portion of the receptacle tube urges the distal end side of the tube body to move away from the opening end portion of the receptacle tube. Therefore, if impact occurs on the headrest in the direction of its height, the impact is absorbed by the spring structure.

The tube body needs merely to be a tube body that is inserted into and supported by the receptacle tube disposed in the seatback, and that retains the headrest stay inserted therein, and that allows adjustment of the height of the headrest stay. For example, the tube body may be a tube body having a retaining hole capable of retaining the headrest stay while orienting the headrest stay in a direction of an axis thereof, and a lock piece retaining hole that allows the lock piece to be inserted thereinto from a side opposite from the height adjustment groove, and that allows the lock nail to be advanced and withdrawn in a direction of insertion.

The spring structure needs merely to be a spring structure that is protruded from a distal end side of the tube body toward the opening end portion of the receptacle tube, and that urges the distal end side of the tube body to move away from the opening end portion of the receptacle tube when the tube body is pushed down to a side of the receptacle tube. The spring structure may be a resin spring formed integrally with the tube body, or may be a spring structure that urges a member formed separately from the tube body by means of a spring or the like, etc.

In the former case, the resin spring is not restricted in shape in a viewpoint that the resin spring needs merely to be able to urge the distal end side of the tube body to move away from the opening end portion of the receptacle tube when the tube body is pushed down to the side of the receptacle tube. That is, the resins spring may be a resin spring that has a ring shape and is deformable in a predetermined direction, or may be a resin spring that has an arm having a flexibility in a predetermined direction, etc.

As an example of the construction in which an arm having a flexibility as-mentioned above is provided, a first resin arm connecting a plurality of positions facing the receptacle tube and a second resin arm extending in a plurality of directions from a central portion of the first arm toward the opening end portion of the receptacle tube may be formed in the tube body. In this example, if an impact occurs in the direction of the height, the impact can be absorbed by causing the first resin arm and the second resin arm contacting the opening end portion to bend in the direction of the height.

In this case, it is also possible to provide the spring structure with an additional function, such as, a function of restricting rotation of the tube body, or the like.

If, as an example of the construction in the aforementioned case, a stopper nail is protruded from a central portion of the first resin arm toward the opening end portion of the receptacle tube, and a stopper groove for restricting rotation of the tube body by engaging with the stopper nail is formed in the receptacle tube, rotation of the tube body can be restricted by the stopper groove receiving and engaging with the stopper nail.

Although the spring structure is provided for absorbing impact in the direction of the height, the tube body may clatter against the receptacle tube if impact occurs in a substantially horizontal direction. Therefore, it is also possible to provide the tube body with a construction for preventing such clattering.

As an example of the construction in the aforementioned case, the invention has a construction including: a tube body that is inserted into and supported by a receptacle tube disposed in a seatback, and that retains a headrest stay inserted therein, and that allows an adjustment of a height of the headrest stay; and a resin-made spring including a flexible portion that is formed between cutout grooves extending in an outer peripheral surface of the tube body substantially parallel in a direction of an axis of the tube body, and that has a flexibility substantially in a direction of a diameter of the tube body, and protrusion that is protruded outwards from the flexible portion, and that presses an inner peripheral surface of the receptacle tube while bending the flexible portion inwards when the tube body is inserted in the receptacle tube.

In the thus-constructed invention, the tube body is inserted in and supported by the receptacle tube disposed in the seatback, and retains the headrest stay inserted therein, and adjusts the height of the headrest stay.

When the tube body is inserted in the receptacle tube, the protrusion protruded outwards from the flexible portion presses the inner peripheral surface of the receptacle tube while causing the flexible portion that is formed between the cutout grooves extending in the outer peripheral surface of the tube body substantially parallel in the direction of the axis of the tube body and that has a flexibility substantially in the direction of the diameter of the tube body to bend inwards, thereby preventing the clattering of the tube body relative to the receptacle tube.

The tube body needs merely to be a tube body that is inserted into and supported by the receptacle tube, disposed in the seatback, and that retains the headrest stay inserted therein, and that allows adjustment of the height of the headrest stay. The tube body may be constructed similarly to the tube body in the invention in accordance with claim 1.

The resin-made spring needs merely to be a resin-made spring which includes a flexible portion that is formed between cutout grooves extending in an outer peripheral surface of the tube body substantially parallel in a direction of an axis of the tube body and that has a flexibility substantially in a direction of a diameter of the tube body, and a protrusion that is protruded outwards from the flexible portion and that presses an inner peripheral surface of the receptacle tube while bending the flexible portion inwards when the tube body is inserted in the receptacle tube, and is able to prevent the tube body from clattering relative to the receptacle tube when an impact occurs in a substantially horizontal direction.

Furthermore, it is possible to provide the resin-made spring with a tapered shape that gradually becomes thinner toward the side of the receptacle tube, so as to allow the tube body to be smoothly inserted into the receptacle tube.

The resin-made spring needs merely to be a resin-made spring that is provided on the outer peripheral surface of the tube body. The resin-made spring may be a resin-made spring that is formed at a single location, resin-made springs that are formed at a plurality of locations, etc.

In the latter case, it is possible to form a resin-made spring from a predetermined location on the outer peripheral surface of the tube body and form another resin-made spring from an outer peripheral surface portion of the tube-body opposite from the aforementioned predetermined location.

Thus, the resin-made springs press the inner peripheral surface of the receptacle tube in opposite directions, so that clattering can-be effectively prevented.

Furthermore, if a plurality of resin-made springs are formed, the resin-made springs may have equal heights or different heights.

In particular, if clattering caused by impact applied in the fore-aft direction of the vehicle during braking or the like needs to be prevented, provision of the resin-made spring in the fore-aft direction of the vehicle will effectively prevents such clattering.

The tube body may also be constructed so as to allow an improvement in the working efficiency of assembly of the headrest stay.

As an example of the construction the aforementioned case, the invention has a construction including: a lock piece having a lock nail disposed at a position that faces a height adjustment groove formed on a side; face of the headrest stay; a tube body having a retaining hole capable of retaining the headrest stay while orienting the headrest stay in a direction of an axis thereof, and a lock piece retaining hole that allows the lock piece to be inserted thereinto from a side opposite from the height adjustment groove, and that allows the lock nail to be advance and withdrawn in a direction of insertion; and engagement structure that engages the lock piece and the tube body with each other and restricts a movement of the lock nail from a position of locking with the height adjustment groove toward an opening of the lock piece retaining hole; and a spring structure that presses the lock piece disposed in the lock piece retaining hole from a side of the lock nail to the headrest stay.

In the thus-constructed invention, when the lock piece is inserted from the lock piece retaining hole formed in the tube body, the lock nail, disposed at a position facing the height adjustment groove, becomes advanceable and withdrawable in the direction of insertion.

When the lock piece is engaged with the tube body by the engagement structure formed between the lock piece and the tube body, the lock nail becomes incapable of being moved from the position of locking with the height adjustment groove formed on the side surface of the headrest stay toward the opening of the lock piece retaining hole.

Therefore, the lock piece will not fall apart from the lock piece retaining hole even though the spring mechanism presses the lock piece from a deep inward side of the lock piece retaining hole toward the opening of the lock piece retaining hole.

Hence, when the headrest stay is to be inserted into the retaining hole after the lock piece is inserted into the lock piece retaining hole during an assembly process, it is not necessary to insert the headrest stay into the retaining hole while pressing the lock piece against the lock piece retaining hole.

After assembly is completed in this manner, the spring mechanism presses the lock piece in the lock piece retaining hole against the headrest stay from the side of the lock nail. Therefore, during a normal state, the lock nail is engaged with the height adjustment groove at the lock position, thereby locking the height of the headrest stay.

If the lock piece is pushed toward a deep inward side of the lock piece retaining hole, the lock nail is withdrawn from the height adjustment groove, so that it becomes possible to change the height of the headrest stay.

Then, when the lock piece is released after the headrest stay is adjusted to a desired height, the lock piece is pushed back toward the opening side by the sprig mechanism, so that the lock piece engages with the height adjustment groove again.

The headrest stay herein needs merely to be a headrest stay that has on its, side surface a height adjustment groove. The headrest support may be a headrest stay having a plurality of height adjustment grooves that are arranged in the direction of the height, or a headrest stay having a height adjustment groove that is formed only at a specific position.

Furthermore, the height adjustment groove may be a slit formed on the side surface of the headrest stay, or may be a retaining hole for retaining the lock piece, or the like.

The lock piece needs merely to be a lock piece which has a lock nail that is disposed at a position that faces the height adjustment groove formed on the side surface of the headrest stay. The lock piece may be a lock piece formed into a generally rectangular shape, or may be a lock piece formed into a frame shape or a squared U shape.

The lock nail needs merely to be a lock nail that is engageable with the height adjustment groove. The lock nail may be a lock nail protruded in the form of a pin, or may be a lock nail formed by a peripheral edge of the lock piece, or the like.

The lock piece may be a lock piece that is entirely formed from the same material. However, if the lock piece is formed from a resin or the like, the strength of the lock nail becomes insufficient although the molding of the engagement nail becomes easy. Furthermore, if the lock piece is formed from a metal or the like; the molding of the engagement nail becomes difficult although a strength of the lock nail can be secured.

Therefore, the lock piece may be a lock piece in which the lock nail and the engagement nail are formed from different materials. The lock piece may also be formed by a metal-made plate having the lock-nail, and a resin-made knob that is provided with the engagement nail and that allows the metal-made plate to be attached thereto.

Furthermore, if a resin-made engagement nail is integrally formed with the resin-made knob, it is possible to adopt, for example, a construction in which the engagement nail has a resin arm protruded to a side opposite from the opening, and a wedge-shaped protrusion formed on a distal end side of the resin arm, and in which the engagement groove restricts insertion of the wedge-shaped protrusion at the opening side of the lock piece retaining hole, and forms, at a deep inward side of the lock-piece retaining hole, a space for receiving the wedge-shaped protrusion so that the wedge-shaped protrusion is movable in the direction of insertion.

When the engagement nail is inserted into the engagement groove, the insertion of the wedge-shaped protrusion is restricted at the opening side of the lock piece retaining hole. Therefore, the wedge-shaped protrusion is displaced to the resin arm side while bending the resin arm, as the wedge-shaped protrusion moves toward the deep inward side of the lock piece retaining hole.

When the wedge-shaped protrusion reaches the deep inward side of the lock piece retaining hole, the wedge-shaped protrusion can be placed in the aforementioned spade, so that the bending of the resin arm is removed.

Therefore, the wedge-shaped protrusion can be advanced and withdrawn in the direction of insertion while it is received in the spaced.

Integral formation of the resin arm together with the resin-made knob is preferable in terms of facilitation of the molding. However, the resin arm needs merely to be a resin arm that is at least capable of bending the wedge-shaped protrusion in a displaceable manner. The resin arm may a resin arm mounted on a member formed from a different material.

If the lockpiece retaining hole is formed to be relatively large in comparison with the dimensions of the lock piece during the resin molding of the tube body, the lock piece tends to clatter, and it becomes difficult to form the lock piece retaining hole in such a manner that the lock piece can be inserted without allowing clattering.

Therefore, it is also possible to form, in the lock piece retaining hole, a slide groove that is formed substantially parallel to the direction of advancement and withdrawal of the lock piece and that receives a side end of the metal-made plate, so that the lock piece is slid along the slide groove for advancement and withdrawal in the direction of insertion.

The slide groove may be slide grooves that are formed in opposite side walls of the lock piece retaining hole for receiving opposite side ends of the metal-made plate, or may be a slide groove that is formed in one side wall of the lock piece retaining hole for receiving only one end of the metal-made plate.

The metal-made plate and the resin-made knob may be placed together into the slide groove. It is also possible to construct the lock piece so that the metal-made plate can be more easily received by the slide groove.

For example, the metal-made plate may be formed to become wider in a direction substantially perpendicular to the direction of advancement and withdrawal of the lock piece than the resin-made knob so that the metal-made plate can be slid while it is received in the slide groove.

The metal-made plate needs merely to be a metal-made plate that has at least a lock nail formed at a side opposite from the opening of the lock piece retaining hole. If metal-made plates formed into a generally squared U shape by stamping out from a metal sheet in which the recesses of squared U-shaped plate portions face each other are used, it becomes possible to reduce unwanted metal pieces that are produced during the process, in comparison with metal-made plates formed into a frame shape.

The tube body needs merely to be a tube body that has a retaining hole capable of retaining the headrest stay while orienting the headrest stay in the direction of the axis thereof, and a lock piece retaining hole that allows the lock piece to be inserted thereinto from a side opposite from the height adjustment groove and that allows the lock nail to be advanced and withdrawn in the direction of insertion. As in the cases of claims 1 and claims 2, the tube body may be a tube body in which the lock piece retaining hole is formed near an opening of the retaining hole, or may be a tube body in which the lock piece retaining hole is formed in partway of the retaining hole.

The engagement structure needs merely to be an engagement structure that engages the lock piece and the tube body with each other and restricts movement of the lock nail from the position of locking with the height adjustment groove toward the opening of the lock piece retaining hole. The engagement structure may be an engagement structure that is formed at a side of the opening of the lock piece retaining hole or a side opposite from the opening, or may be an engagement structure that is formed in the direction of height and a side face of the lock piece retaining hole, or the like.

The engagement structure needs merely to be an engagement structure that is constructed so as to be able to engage the tube body and the lock piece with each other. The engagement structure may be an engagement structure in which an engagement nail formed in the tube body is engaged with an engagement groove formed in the lock piece, or may be an engagement structure in which, conversely, an engagement nail formed in the lock piece is engaged with an engagement groove formed in the tube body, or the like.

In the latter case, it is also possible to form an engagement nail protruded from the lock piece toward a side opposite from the opening and to form an engagement groove capable of engaging with the engagement nail at the deep inward side of the lock piece retaining hole in the tube body, so that the engagement nail protruded from the lock piece toward the side opposite from the opening is engaged with the engagement groove formed at the deep inward side of the lock piece retaining hole.

The spring mechanism needs merely to be a spring mechanism that presses the lock piece in the lock piece retaining hole from the side of the lock nail to the headrest stay. The spring mechanism may be a spring mechanism in which a helical coil is interposed at the opening side between the lock piece and the tube body, or a spring mechanism in which a helical coil is disposed at a side opposite from the opening between the lock piece and the tube body, or the like.

The spring mechanism is not limited to a spring mechanism having a helical coil as mentioned above, but may also be a spring mechanism constructed by a resin-made spring structure formed integrally with the tube body, a resin-made spring structure formed integrally with the lock piece, or the like.

A user performs height adjustment of the headrest in accordance with a need after withdrawing the lock piece from the height adjustment groove. If the headrest is pushed down to the side of the seatback by inserting the headrest stay deeply into the tube body, the resin-made knob becomes positioned in a narrow gap between the headrest and the seatback.

Therefore, in order to avoid engagement of the lock piece with the height adjustment groove when the headrest is pushed down to the side of the seatback, a height adjustment groove is normally not formed at a position that faces the lock piece in that situation.

Hence, as a substitute for the height adjustment groove, a tentative engagement structure may be provided for tentatively engaging the headrest stay with the tube body when the headrest is pushed down to the side of the seatback, so that the headrest stay is tentatively engaged with the tube body to restrict movement of the headrest stay in the direction of the axis thereof.

The tentative engagement herein means engagement of the headrest stay with the tube body to such a degree that in a situation where the headrest support is installed in a vehicle, the headrest will not change in height nor clatter despite impacts caused at the time of braking or the like, and means that when a user applies a force in such a direction as to pull the headrest stay out of the tube body in order to change the height of the headrest, a disengaged state is established to allow a height change.

The tentative engagement structure needs merely to be a tentative engagement,structure that tentatively engages the headrest stay with the tube body in a situation where the headrest is pushed down to the side of the seatback. The tentative engagement structure may be a tentative engagement structure that is caused to tentatively engage the headrest stay by an operation performed by a user, or a tentative engagement structure that engages the headrest stay with the tube body without requiring an operation performed by a user.

In the latter case, the tentative engagement structure may include a tentative engagement groove formed in a side face of the headrest stay, a tentative engagement nail that tentatively engages with the tentative engagement groove to restrict movement of the headrest stay in the direction of the axis thereof, and a spring mechanism that urges the tentative engagement nail to a side of the tentative engagement groove.

Due to this construction, the tentative engagement nail is pressed outwards by the side face of the headrest stay until the tentative engagement groove reaches a position that faces the tentative engagement nail. When the tentative engagement groove reaches the position facing the tentative engagement nail, the tentative engagement nail is moved to the side of the tentative engagement groove by the force from the spring mechanism to tentatively engage with the tentative engagement groove.

It is also possible to pre-adjust the shape of the tentative engagement nail, the spring modulus of the spring mechanism, etc. so that when it is desired that the tentative engagement nail tentatively engaged with the tentative engagement groove be withdrawn from the tentative engagement groove, that is, when a user is about to change the height of the headrest, the tentative engagement can be discontinued by the user applying a force to pull the headrest away from the seatback, whereas the tentative engagement is maintained despite impacts at the time of braking or the like. The tentative engagement structure may also be constructed so that the tentative engagement can be discontinued by a user performing a predetermined operation, for example, depressing a button or the like.

In this case, the tentative engagement structure may be provided with a drive mechanism that moves the tentative engagement nail to a side of withdrawal from the height adjustment groove.

As a result, based on depression of an operating button or the like performed by a user, the drive mechanism moves the tentative engagement nail to the side of withdrawal from the height adjustment groove.

The drive mechanism may be a drive mechanism that moves the tentative engagement nail to the side of withdrawal from the height adjustment groove via a gear mechanism or the like, or may be a drive mechanism that draws a metal-made tentative engagement nail by means of an electric magnet disposed outward of the tube body, or the like.

The tentative engagement groove needs merely to be a tentative engagement groove engageable with the tentative engagement nail. The tentative engagement groove may be a tentative engagement groove formed in a shape different from that of the height adjustment groove, or may be a tentative engagement groove formed in a shape identical to that of the height adjustment groove.

In the former case, if at the distal end side of the headrest stay, a tentative engagement face formed substantially perpendicularly to the direction of insertion into the tube body is formed in the tentative engagement groove, the tentative engagement nail can be engaged with the tentative engagement face formed at the distal end side of the headrest stay substantially perpendicularly to the direction of insertion into the tube body when the tentative engagement nail is to be engaged with the tentative engagement groove, so that even if force is applied in such a direction as to pull the headrest stay out of the tube body, the tentative engagement is more likely to be maintained, and the height of the headrest is less likely to change.

On the other hand, in the latter case, if the tentative engagement groove is formed by the height adjustment groove, it becomes possible to engage the lock piece and the tentative engagement nail with the height adjustment groove in order to restrict movement of the headrest stay in the direction of the axis thereof.

Furthermore, it is also possible to provide a constriction portion, as the tentative engagement groove, which gradually becomes thinner from the distal end of the headrest stay and becomes gradually thicker toward a side of a base end thereof.

Due to this construction, as the headrest stay is inserted into the tube body, the tentative engagement nail is pressed outwards by the distal end of the headrest stay, and is then gradually pushed back inwards in accordance with the shape of the constriction portion to establish tentative engagement.

BEST MODES FOR CARRYING OUT THE INVENTION

Embodiments of the invention will be described hereinafter with reference to the drawings.

Figure 1:
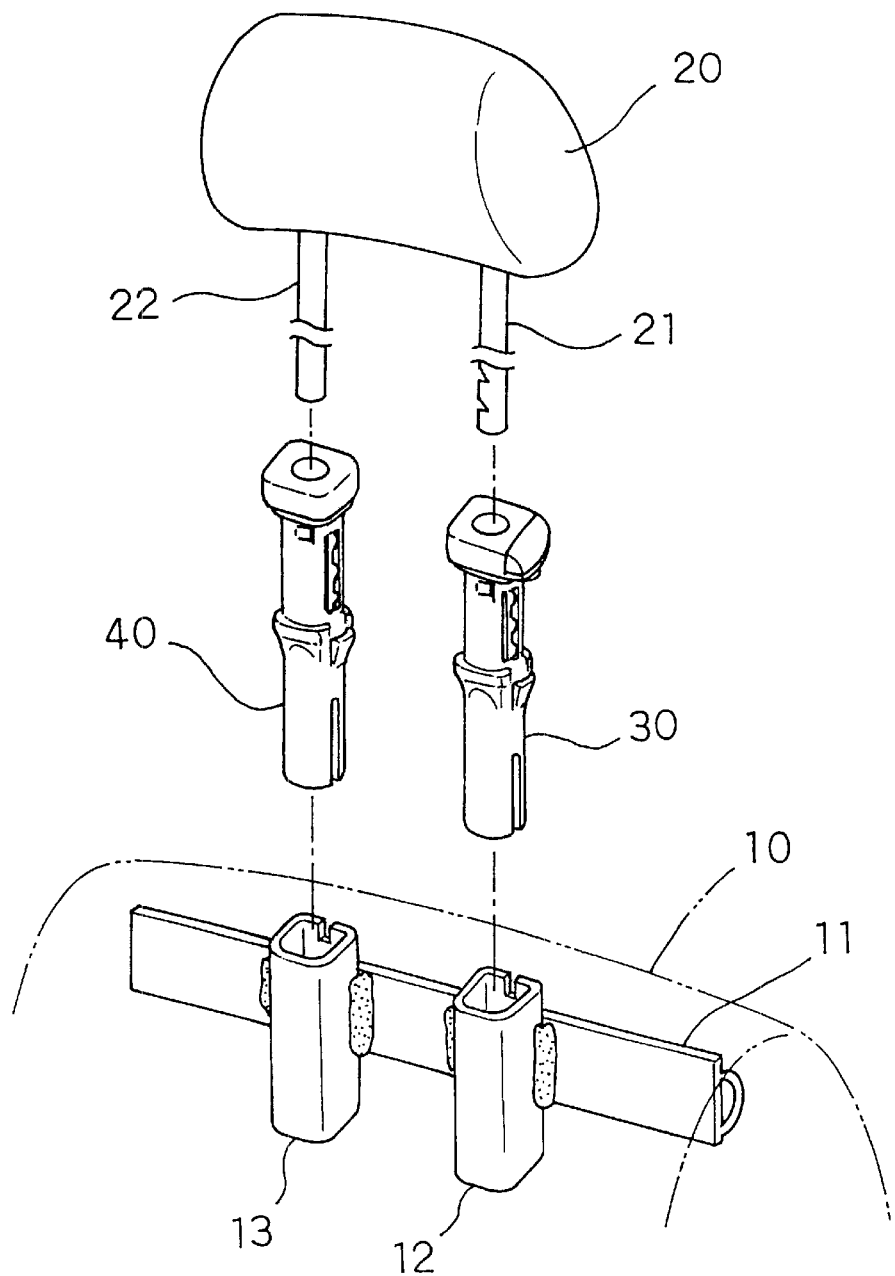
FIG. 1 is a perspective view showing an example of use of a headrest support according to an embodiment.

FIG. 1 shows an example of use of a headrest support according to a first embodiment of the invention in a perspective view.

In the drawing, a frame 11 aligned in an upper side portion of a seatback 10 in a direction of a width thereof is provided with receptacle tubes 12, 13 that are aligned in a direction of a longitudinal dimension of the seatback 10 and that are fixed by welding at a predetermined interval.

Headrest stays 21, 22 protruded downward from a bottom surface of a headrest 20 are inserted into resin-made tubular headrest supports 30, 40 that are inserted in and supported by the receptacle tubes 12, 13. The headrest stays 21, 22 are indirectly supported by the frame 11 via the headrest supports 30, 40.

Figure 2:
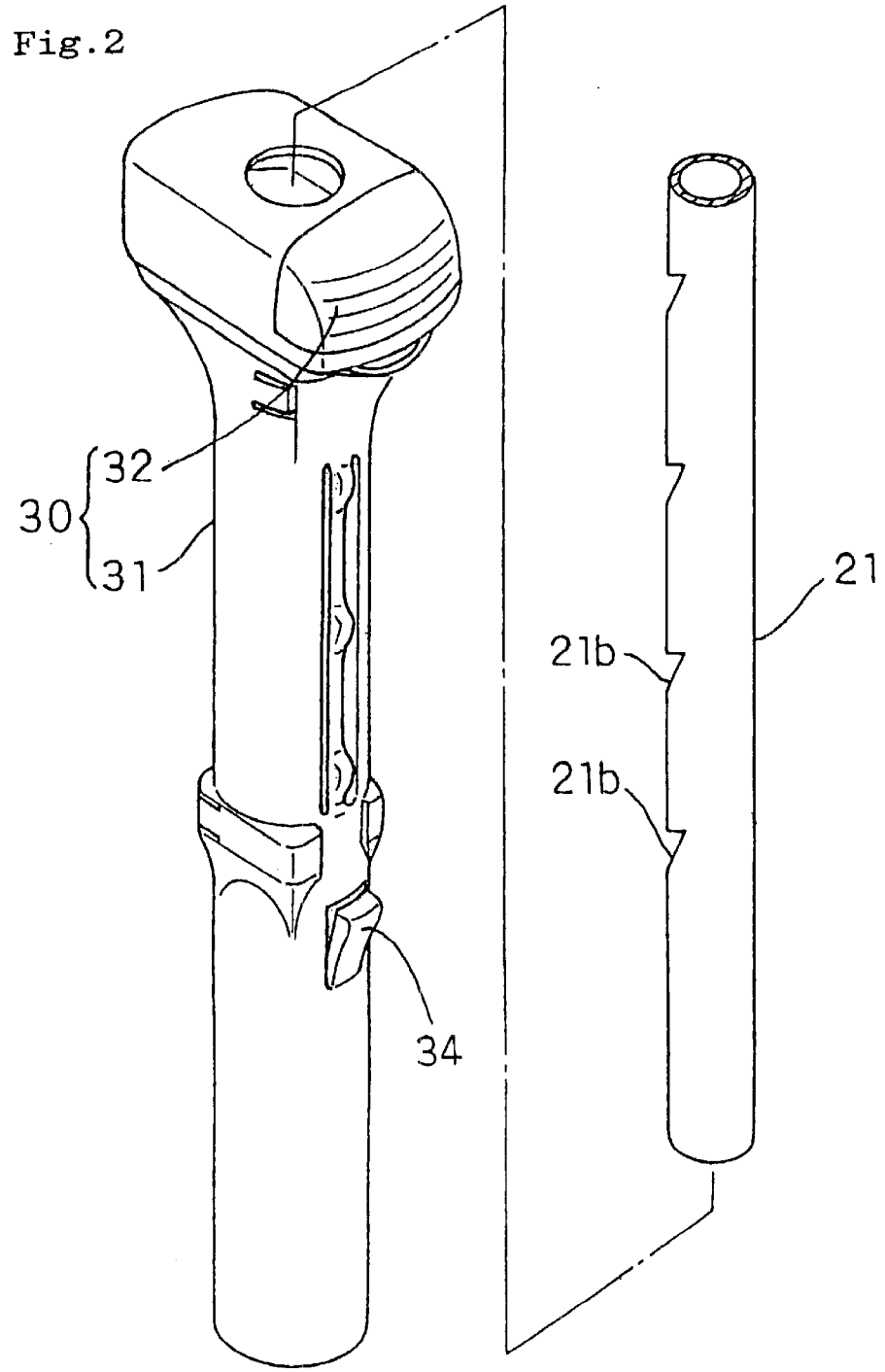
FIG. 2 is a perspective view showing the headrest support, into which a headrest stay is to be inserted.

One of the juxtaposed headrest stays 21, 22, that is, a headrest stay 21, has a plurality of height adjustment grooves 21b that are arranged in a side surface of the headrest stay 21 extending from a distal end side thereof. As shown in FIG. 2, a headrest support 30 into which the headrest stay 2 is inserted is made up of a tube body 31 forming substantially the whole body of the headrest support 30, and a lock piece 32 that is supported at an upper end of the tube body 31 and that is engageable with the height adjustment grooves 21b. It is assumed that in FIG. 2, a left-upward side in the sheet of drawing is defined as a left side, and an upward side in the sheet of drawing is defined as an upper side.

Figure 3:
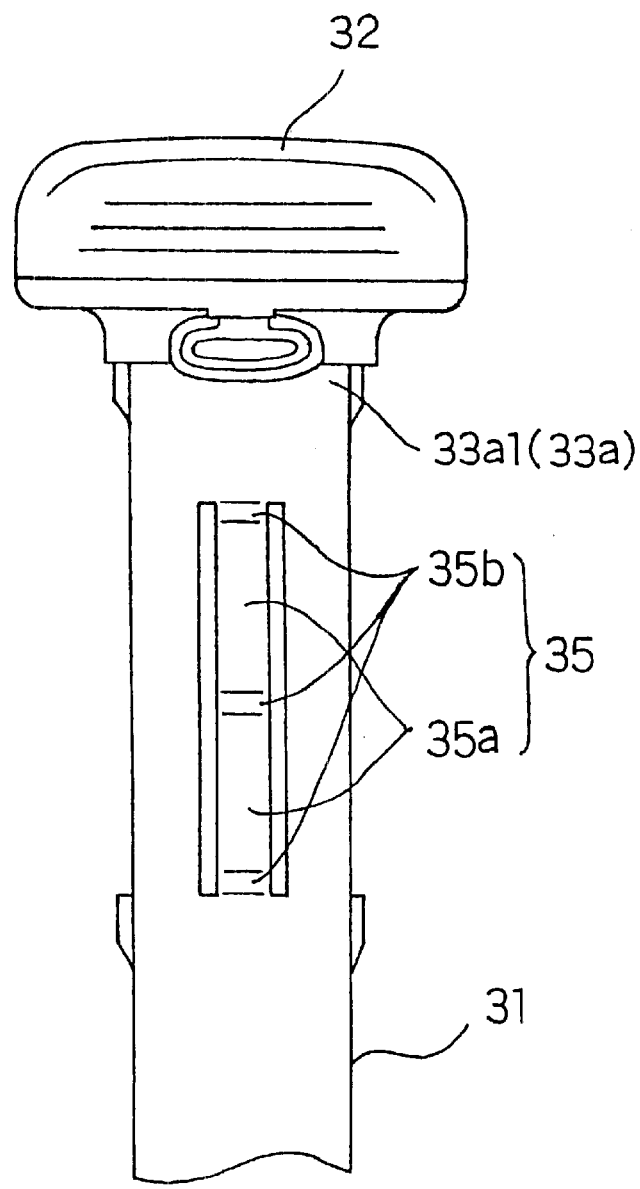
FIG. 3 is a side view showing a spring structure before a tube body is attached to a receptacle tube.

As shown in FIG. 3, at a n upper end side of the tube body 31, a spring structure 33a is formed substantially vertically downward from a lower side of an opening of a lock piece retaining hole 31b (see FIG. 10) for insertion of the lock piece 32.

The spring structure 33a is protruded from a lower side of the lock piece retaining hole 31b, and has at its distal end side a ring portion 33a1 that is deformable in a substantially vertical direction. Flexible pieces 34, 34 shown in FIG. 2 that are provided in a lower portion of the tube body 31 are bent inwards while the tube body 31 is being inserted into the receptacle tube 12. When the insertion of the tube body 31 into the receptacle tube 12 is completed as the flexible pieces 34, 34 protrude from a lower end opening of the receptacle tube 12, and are forced outwards by their own springy forces so as to engage with an opening end portion of the receptacle tube 12, the ring portion 33a1 is pressed against a peripheral edge of an opening of the receptacle tube 12, thereby urging an upper end side of the headrest support 30 upwards from the side of the receptacle tube 12.

Therefore, if an impact occur in an up-down direction, the impact can be absorbed by the ring portion 33a1 deforming, that is, crushing, in the up-down direction.

At such a moment, the spring structure 33a absorbs the impact while dispersing it at two side end sites of the ring portion 33a1. Therefore, the impact can be efficiently absorbed, and damages to the spring structure 33a can be reduced.

Figure 4:
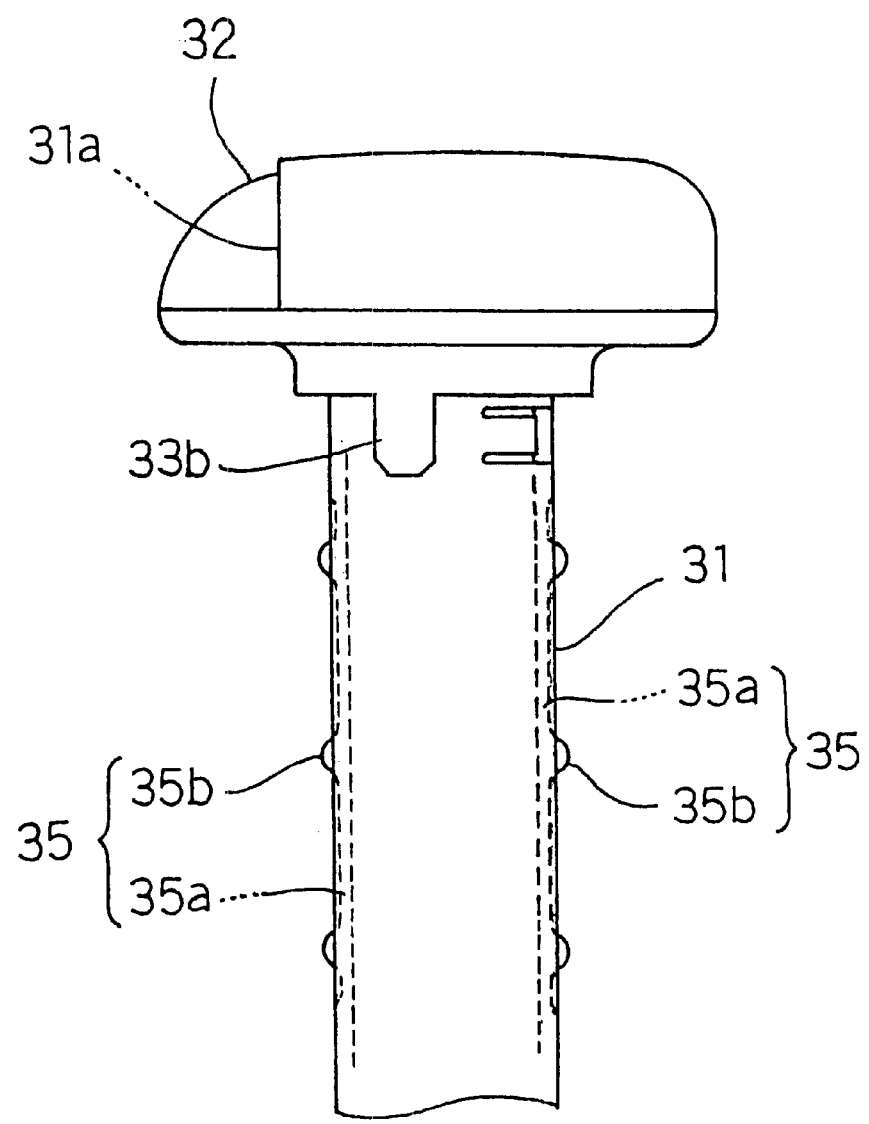
FIG. 4 is a fragmental perspective view showing an external appearance of the receptacle tube.
Figure 5:
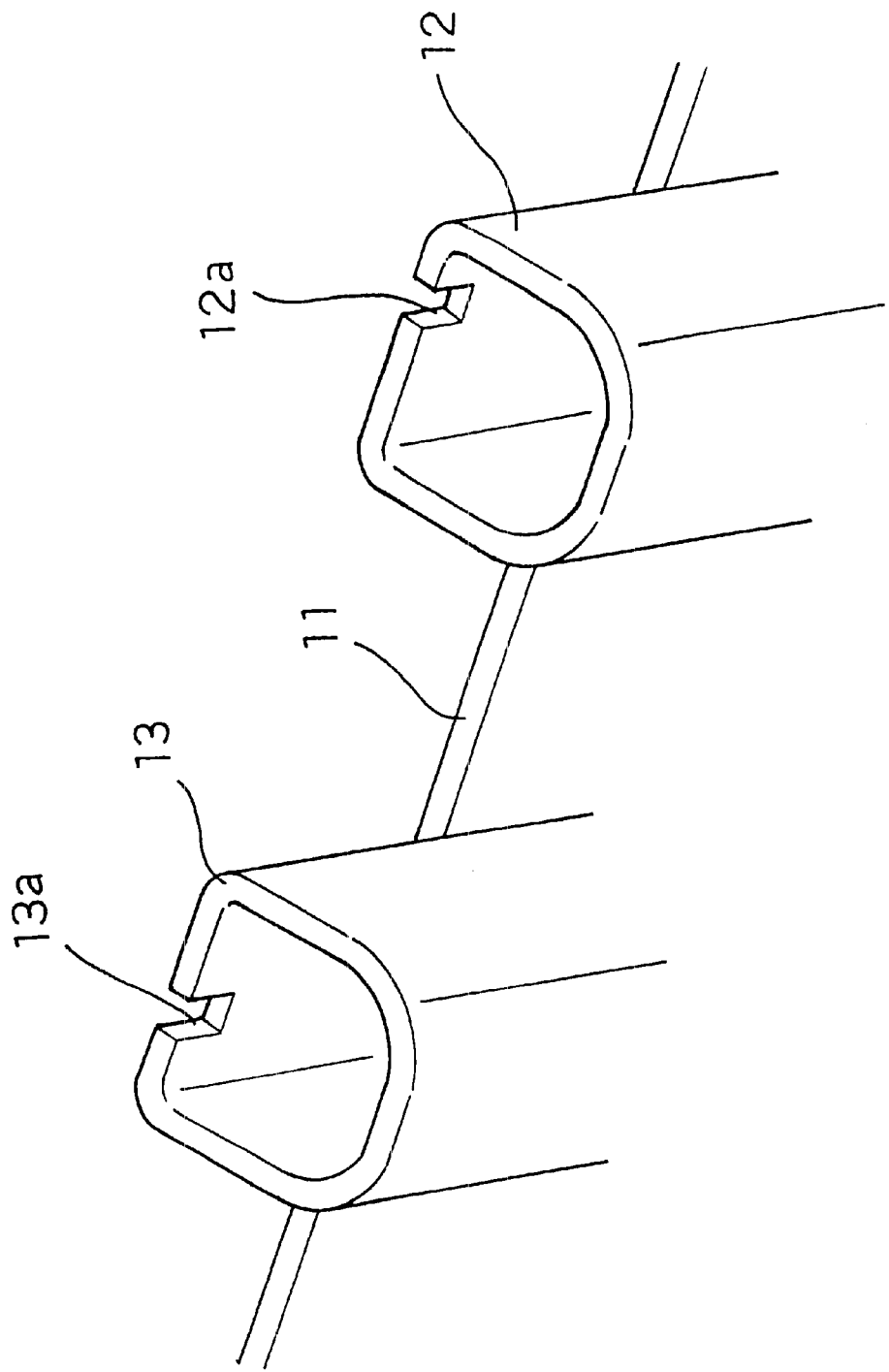
FIG. 5 is a side view showing the spring structure, where the tube body is attached to the receptacle tube.

As shown in FIG. 4, a back face side of the tube body 31 shown in FIGS. 1 and 2 is provided with a stopper nail 33b protruded substantially vertically downwards from an upper end side. As shown in FIG. 5, the receptacle tube 12 has a cutout groove 12a that extends substantially in a direction of an axis of the receptacle tube 12 from an opening end portion thereof and that is capable of receiving the stopper nail 33b.

Figure 6:
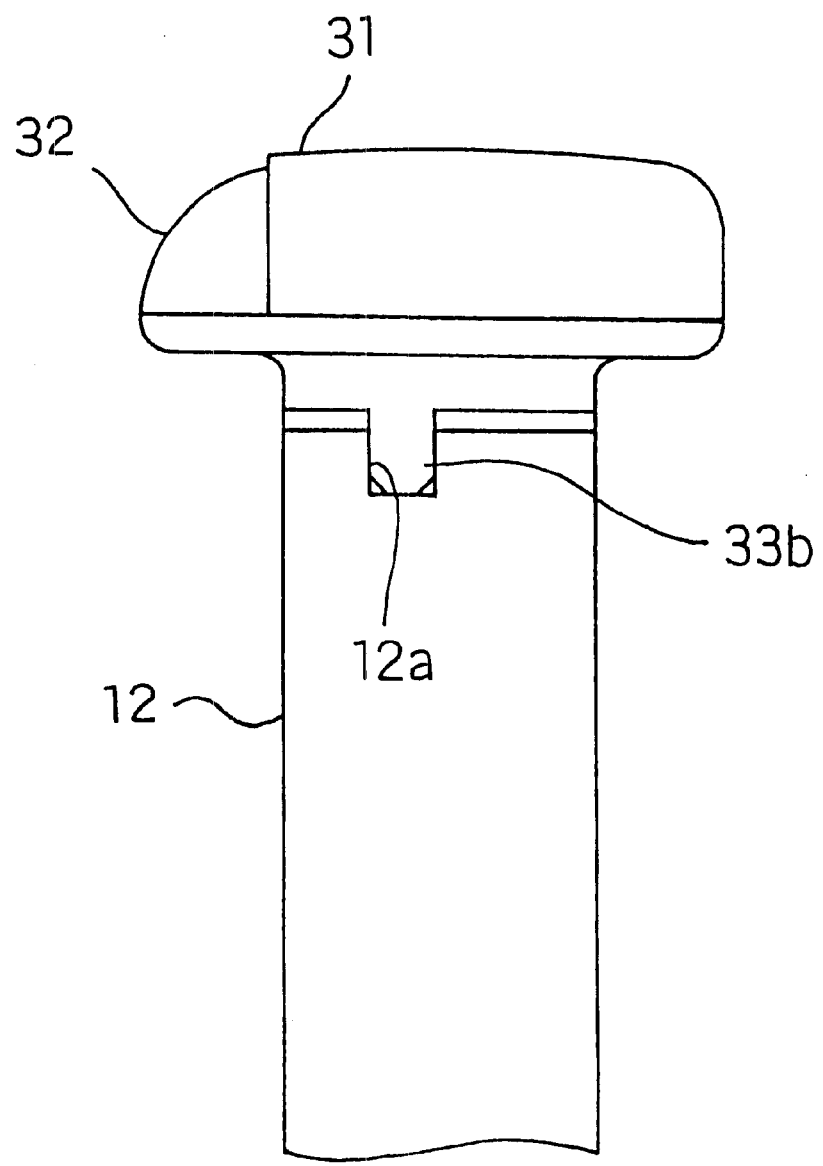
FIG. 6 is a front view showing a construction of a resin-made spring.

Owing to this construction, the stopper nail 33b is inserted into the cutout groove 12a as shown in FIG. 6 when the tube body 31 is inserted into the receptacle tube 12. Thus, rotation of the tube body 31 relative to the receptacle tube 12 in circumferential directions is restricted.

The cutout grooves 12a, 13a formed in the receptacle tubes 12, 13 are formed at positions that are offset toward sides that are remote from each other as indicated in FIG. 5, so that the headrest supports 30, 40 are received by the predetermined receptacle tubes 12, 13.

This construction prevents reversed insertion of the headrest support 30 provided with the lock piece 32 and the headrest support 40 not provided with a lock piece 32.

As shown in FIGS. 3 and 4, resin-made springs 35 are formed on the tube body 31 in order to prevent clattering even when the headrest support 30 inserted in the receptacle tube 12 receives an impact in a right-left direction.

The resin-made springs 35 have flexible portions 35a that are formed between cutout grooves extending in the outer peripheral surface of the tube body 31 substantially parallel to each other in up-down directions and that has flexibility substantially in directions of the diameter of the tube body 31. Protrusions 35b are protruded outwards from the flexible portions 35a.

Figure 7:
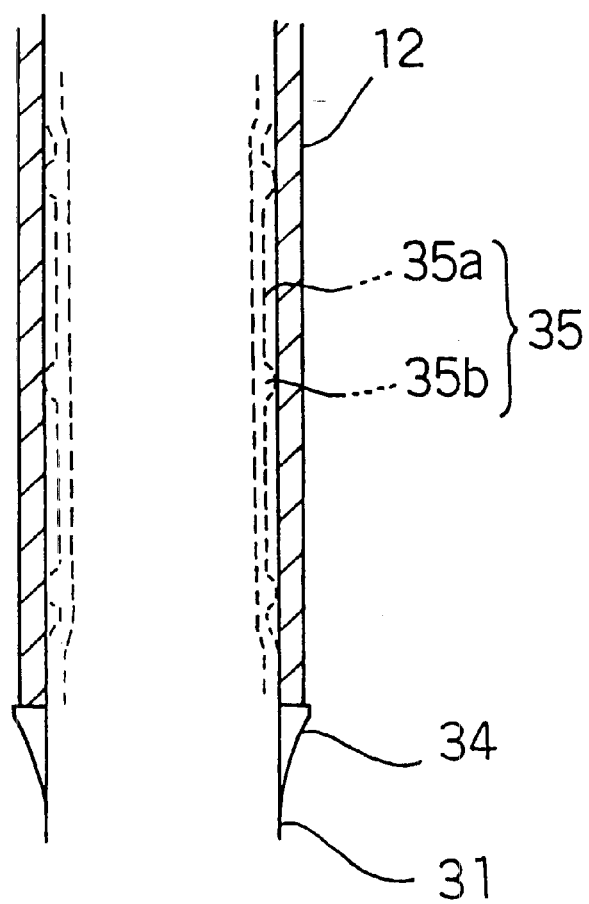
FIG. 7 is a sectional view showing the resin-made spring, where the tube body is attached to the receptacle tube.

Due to this construction, when the tube body 31 is inserted. in the receptacle tube 12, the protrusions 35b press an inner peripheral surface of the receptacle tube 12 while causing the flexible portions 35a to bend inwards as shown in FIG. 7, thereby preventing the tube body 31 from clattering.

Furthermore, in order to prevent clattering even when the headrest support 30 inserted in the receptacle tube 12 receives an impact in a front-rear direction, a clattering preventative structure 36 is formed at positions in the front-rear direction near the upper end side and near a central portion of the tube body 31.

Figure 8:
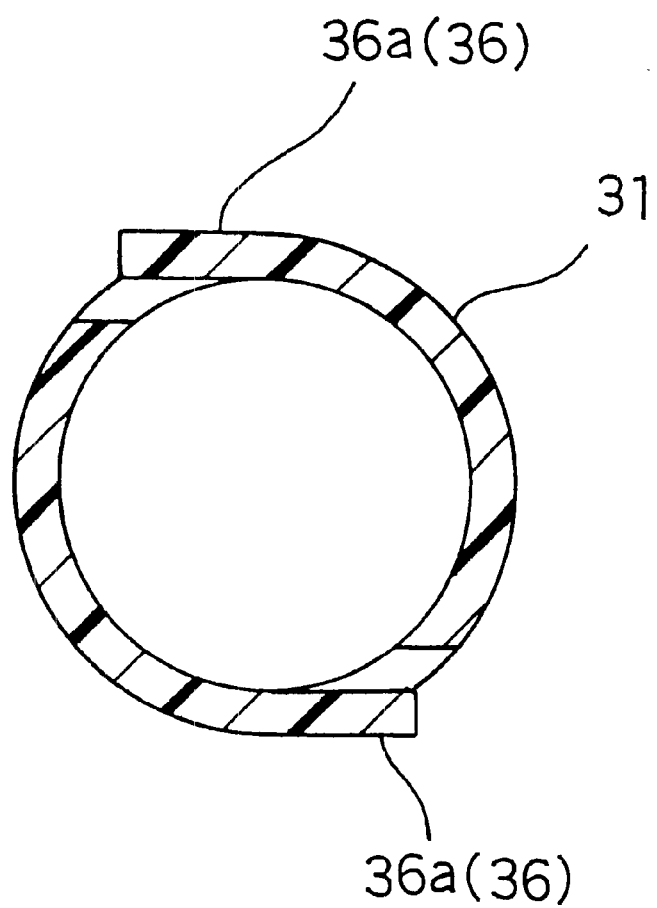
FIG. 8 is a sectional view showing a flexible piece before the tube body is attached to the receptacle tube.

The clattering preventative structure 36 has generally rectangular flexible pieces 36a that are formed by a generally squared U-shaped groove being formed in the outer peripheral surface of the tube body 31. A distal end side of each flexible piece 36a is slightly protruded outwards as shown in FIG. 8 before the tube body 31 is inserted into the receptacle tube 12.

Figure 9:
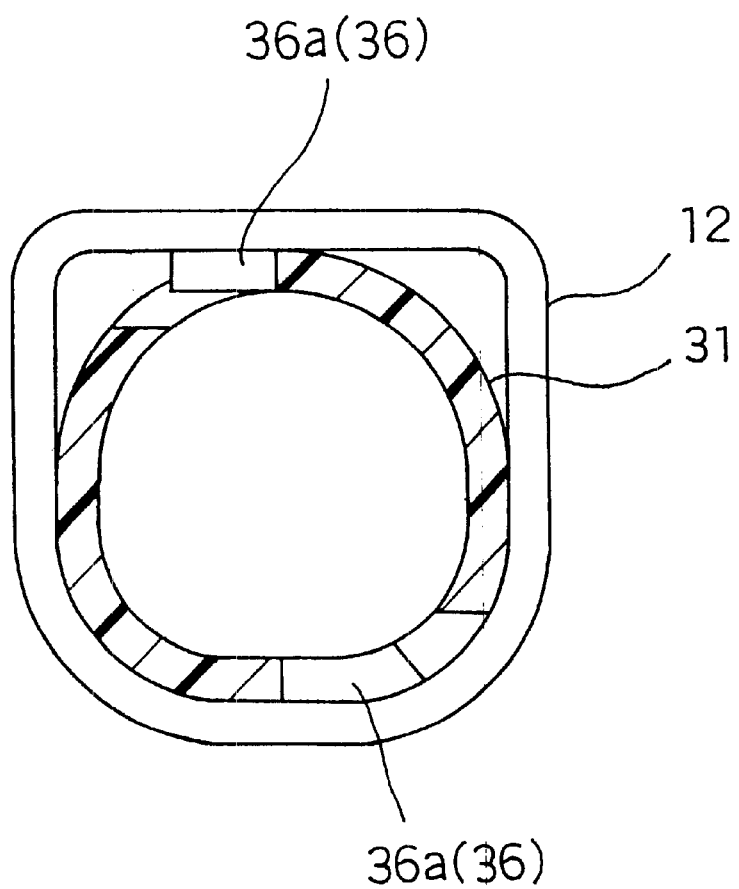
FIG. 9 is a sectional view showing the flexible piece when the tube body is attached to the receptacle tube.

When the tube body 31 is inserted into the receptacle tube 12, the flexible pieces 36a are pressed and therefore bent inwards by the inner peripheral surface, so that sectional shapes of the tube body 31 are changed into generally ring-like sectional shapes as shown in FIG. 9.

In this situation, the flexible pieces 36a tend to restore their original shape and therefore press the inner peripheral surface of the receptacle tube 12, so that the tube body 31 can be prevented from clattering.

Each-flexible piece 36a has a tapered shape that gradually becomes thinner toward a lower end so as to facilitate insertion of the tube body 31 into the receptacle tube 12 even if the flexible piece 36a interferes with an opening edge portion of the receptacle tube 12 when the tube body 31 is inserted into the receptacle tube 12 from the upper end opening.

The spring structure 33a, the stopper nail 33b, the resin-made springs 35 and the clattering preventative structure 36 are described above in conjunction with the tube body 31. Comparable structures are formed at corresponding position in a tube body constituting the headrest support 40.

Figure 10:
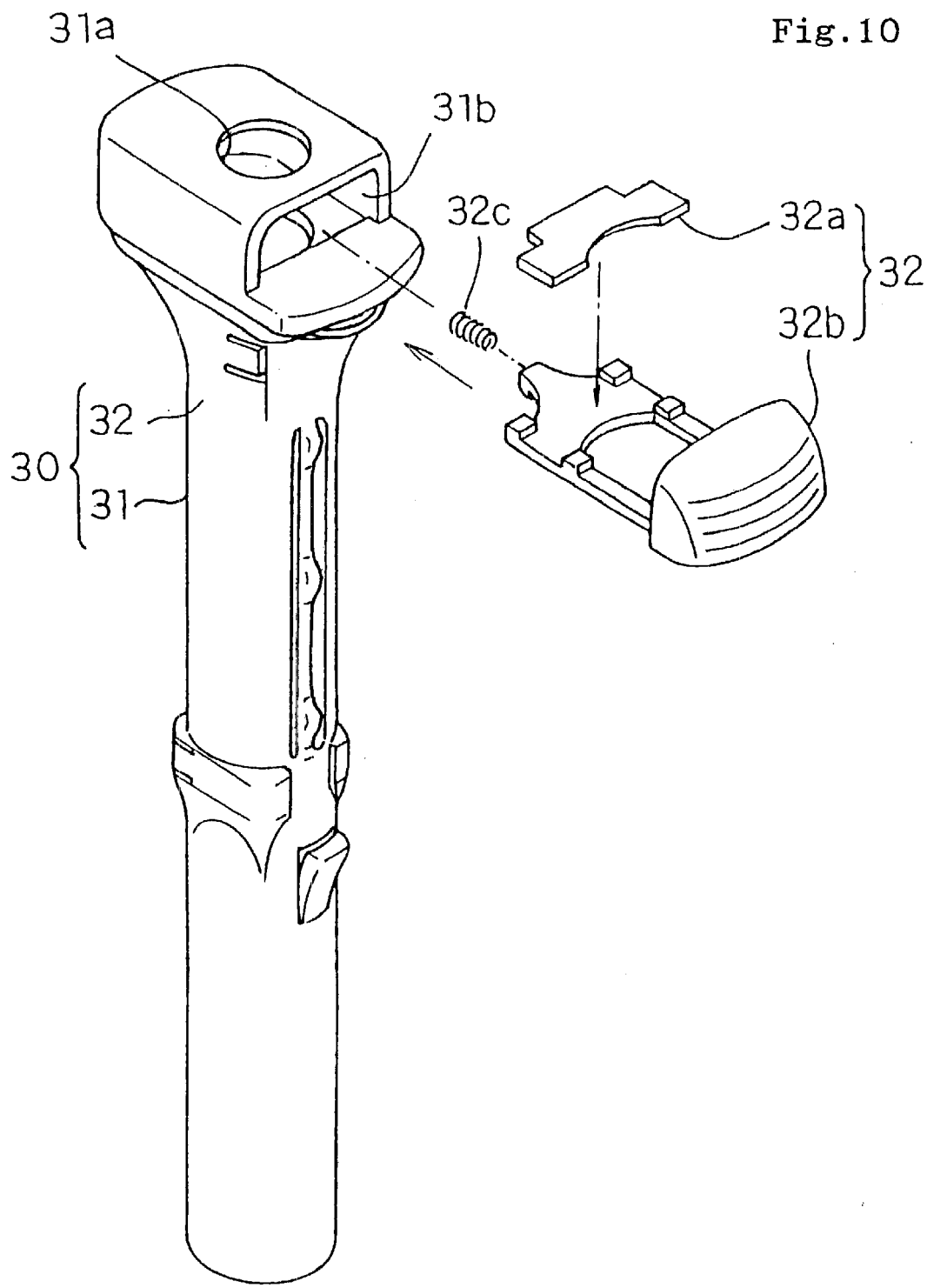
FIG. 10 is a perspective view showing a situation before a lock piece is attached to the tube body.

As shown in FIG. 10, the tube body 31 has a through-hole 31a extending through in the up-down direction, and has, at is upper end, the lock piece retaining hole 31b having an opening directed rightwards. Therefore, the tube body 31 retains the headrest stay 21 inserted into the through-hole 31a, and supports the lock piece 32 inserted into the lock piece retaining hole 31b from the right side.

Figure 11:
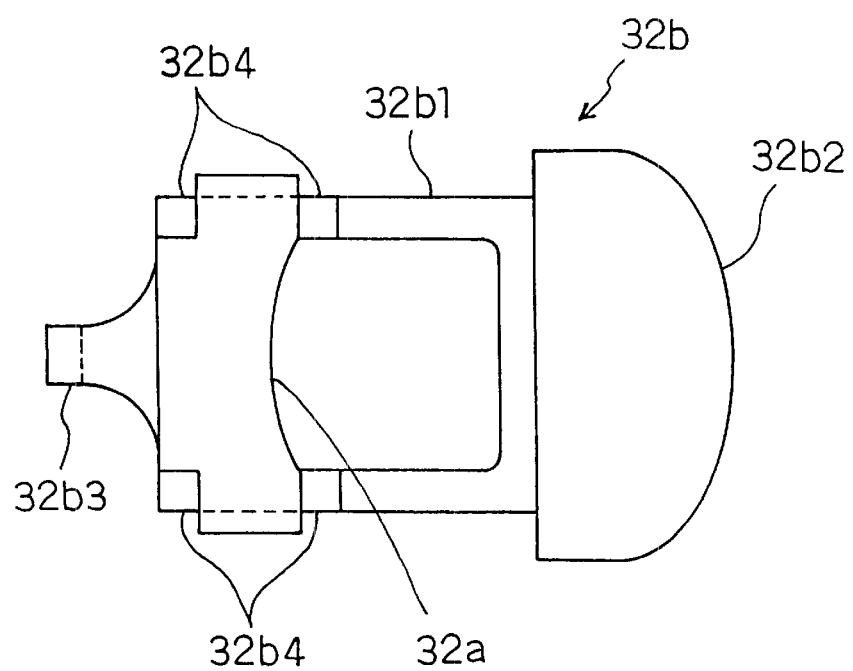
FIG. 11 is a plan view showing a construction of the lock piece.

The lock piece 32 has a generally rectangular metallic plate 32a engageable with the height adjustment grooves 21a, and a resin-made knob 32b that is capable of being inserted into the lock piece retaining hole 31b while carrying thereon the metal-made plate 32a. When the headrest stay 21 is inserted into the through-hole 31a as indicated in FIG. 2 after the metal-made plate 32a attached to the resin-made knob 32b is inserted into the lock piece retaining hole 31b, the metal-made plate 32a engages with a height adjustment groove 21a to fix the height of the headrest 20. In this sense, the metal-made plate 32a forms a lock nail that is referred to in the invention. As shown in FIG. 11, the resin-made knob 32b has a frame portion 32b1 that has a through-hole to avoid interference with the headrest stay 21, an operating portion 32b2 formed integrally at a right-side end of the frame portion 32b1, and a flexible arm 32b3 protruded leftwards from the frame portion 32b1. After the metal-made plate 32a is placed between four protrusions 32b4 protruded upward from an upper surface of a left side portion of the frame portion 32b1, the lock piece 32 is inserted into the lock piece retaining hole 31b by pushing the operating portion 32b2 leftwards while disposing a spring 32c between the lock piece 32 and the opening side of the lock piece retaining hole 31b, as indicated in FIG. 10.

Figure 12:
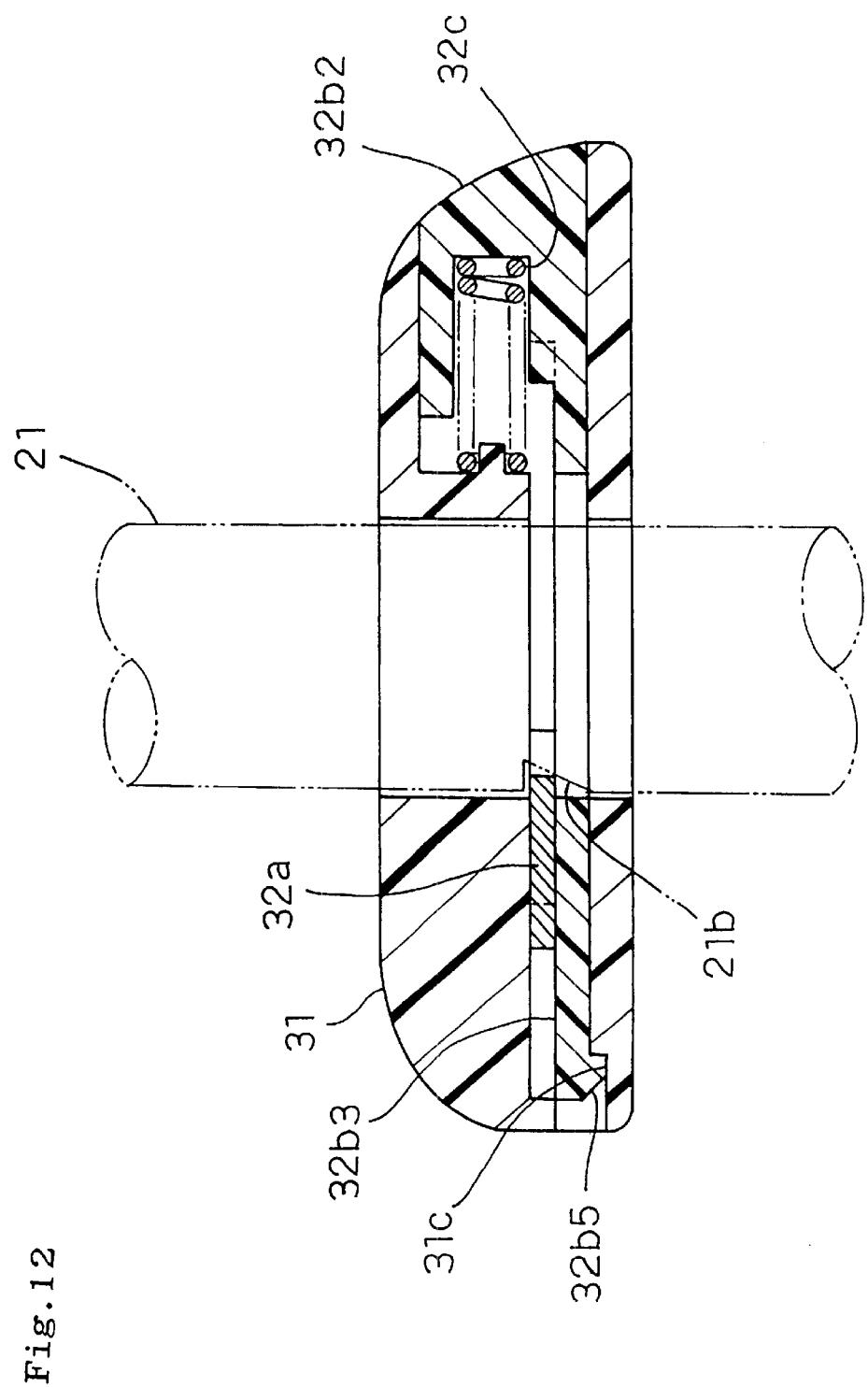
FIG. 12 is a sectional view showing a situation when a metal-made plate has been engaged with a height adjustment groove.

As shown in FIG. 12, a wedge-shaped protrusion 32b5 is formed on a distal end side of the flexible arm 32b3. An engagement groove 31c capable of receiving and engaging with the wedge-shaped protrusion 32b5 is formed deeply inwards within the lock piece retaining hole 31b. Therefore, when the wedge-shaped protrusion 32b5 reaches the engagement groove 31c after the wedge-shaped protrusion 32b5 is inserted deeper into the lock piece retaining hole 31b while being bent upward, the wedge-shaped protrusion 32b5 is forced back down to engage with the engagement groove 31c, so that the lock piece 32 cannot be pulled out of the opening of the lock piece retaining hole 31b. In this sense, the engagement groove 31c and the wedge-shaped protrusion 32b5 form an engagement mechanism referred to in the invention.

When the headrest stay 21 is inserted from the through-hole 31a as indicated in FIG. 2, an inwardly located edge portion of the lock piece 32 is received by a height adjustment groove 21a and thus establishes an engaged state since the lock piece 32 is urged toward the opening side of the lock piece retaining hole 31b by the spring 32c as shown in FIG. 12. In this sense, the spring 32c forms a spring mechanism referred to in the invention.

As shown in the drawing, the engagement groove 31c extends from a deeply inward portion of the lock piece retaining hole 31b to a side opposite from the opening of the lock piece retaining hole 31b, so that the wedge-shaped protrusion 32b5 inserted therein can be moved in the direction of insertion.

Therefore, when a user pushes the operating portion 32b2 toward a deeply inward portion of the lock piece retaining hole 31b, the lock piece 32 is moved further inwards in the lock piece retaining hole 31b against the force from the spring 32c, so that the metal-made plate 32a is withdrawn from the height adjustment groove 21a.

Then, the headrest stay 21 enters a state of being advanceable and withdrawable in the directions of an axis thereof. Therefore, the user changes the height of the headrest 20 to a desired height, and moves another height adjustment groove 21a to a position that faces the metal-made plate 32a, and then releases the operating portion 32b2, so that the lock piece 32 is moved back toward the opening of the lock piece retaining hole 31b by the force from the spring 32c and the metal-made plate 32a is received in and engaged with the height adjustment groove 21a.

Figure 13:
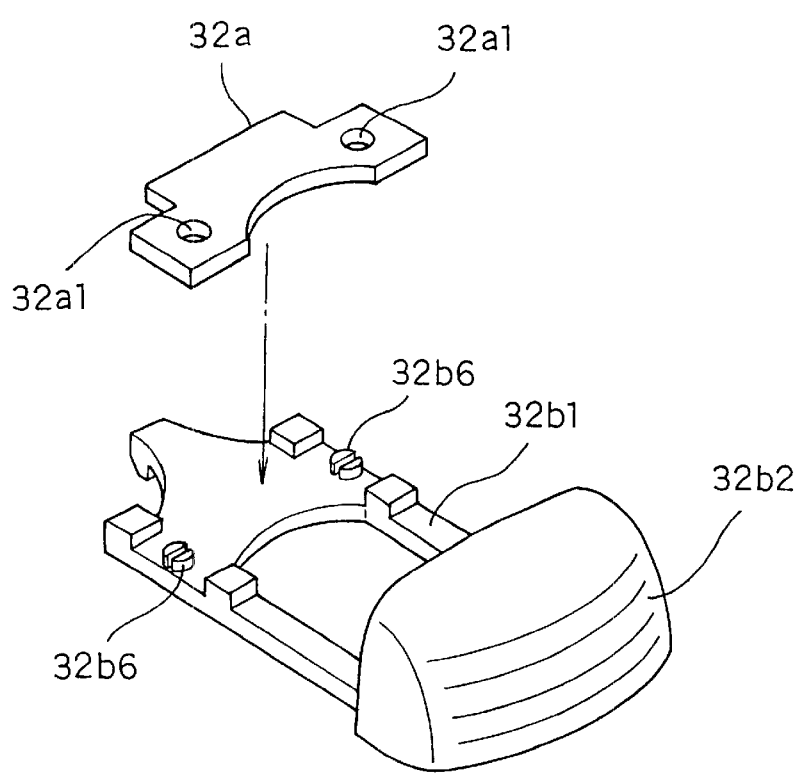
FIG. 13 is an exploded perspective view showing a construction of a lock piece-according to a modification.

As shown in FIG. 13, the lock piece 32 may have a pair of stopper pieces 32b6 that are provided integrally with and protruded upwards from the upper surface of the left side portion of the frame portion 32b1, and the metal-made plate 32a may have stopper holes 32a1 at positions that face the stopper pieces 32b6, so as to prevent the metal-made plate 32a from clattering against the resin-made knob 32b.

Figure 14:
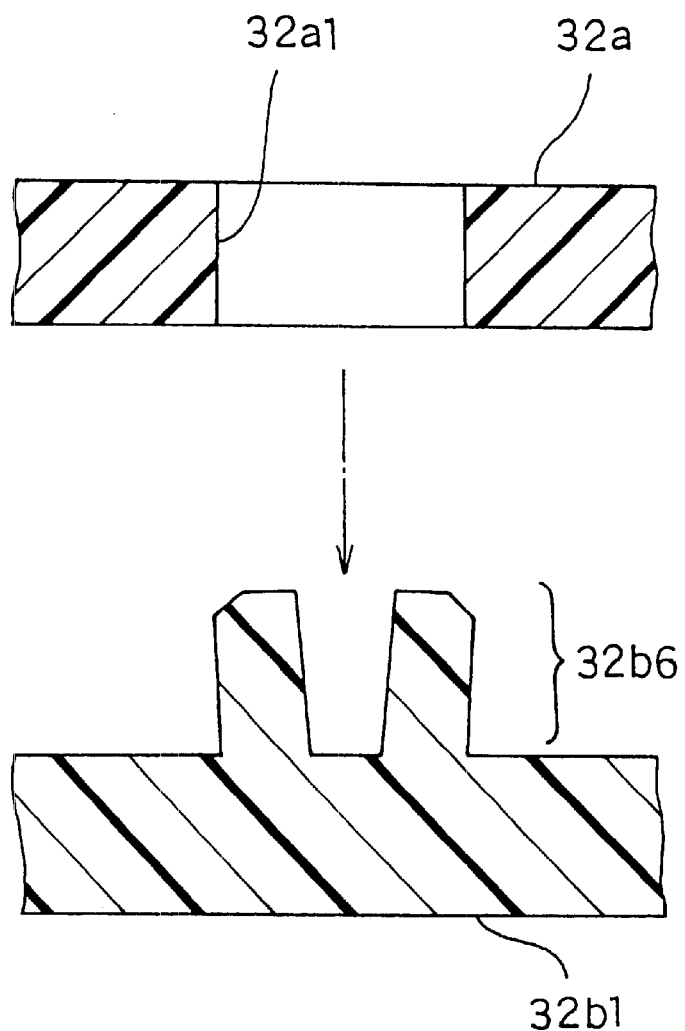
FIG. 14 is a fragmental sectional view showing a situation before the metal-made plate is attached to a resin-made knob.
Figure 15:
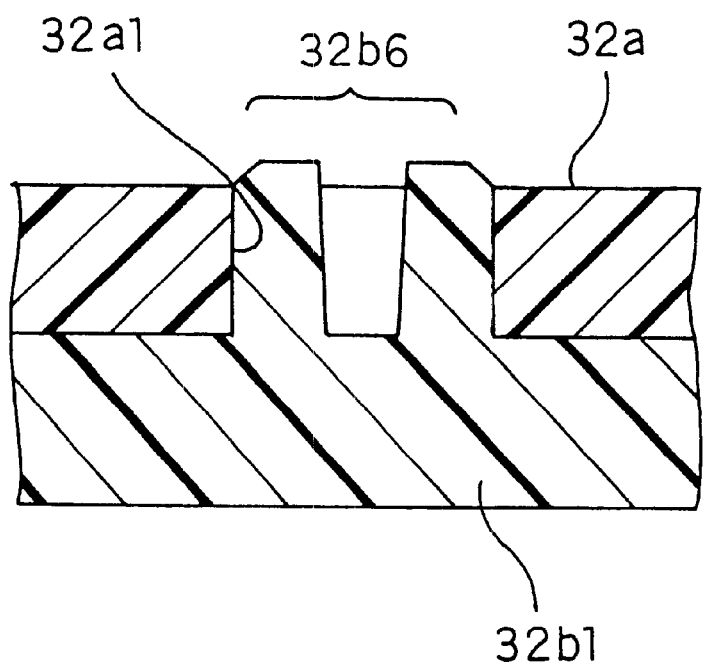
FIG. 15 is a fragmental sectional view showing a situation when the metal-made plate has been attached to the resin-made knob.
Figure 16:
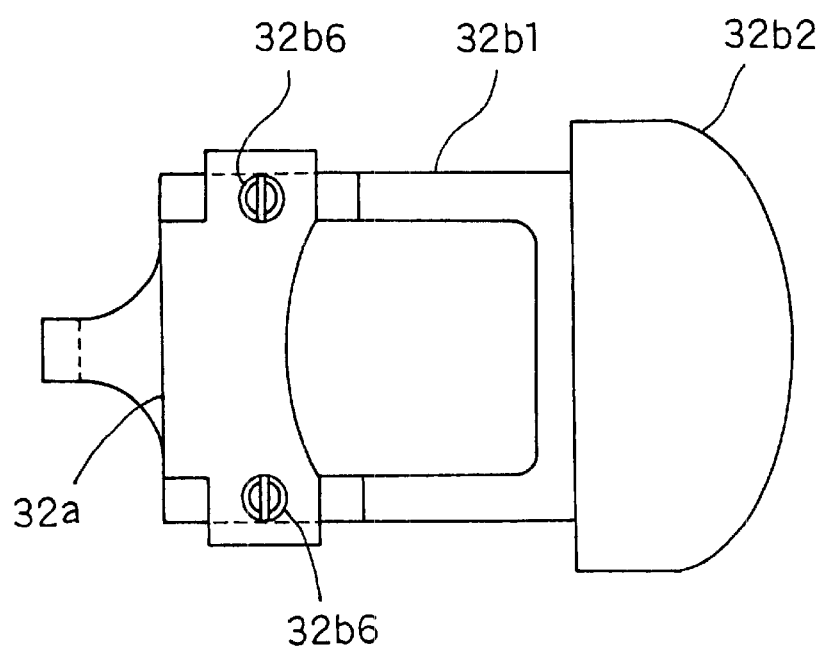
FIG. 16 is a plan view showing a construction of the lock piece n which the metal-made plate has been attached to the resin-made knob.

More specifically, as shown in FIG. 14, each of the stopper pieces 32b6 is formed, by a pair of semi-cylindrical bodies that have flexibility inwards in directions of a diameter thereof, and that are disposed leaving a predetermined interval therebetween. As shown in FIG. 15, each stopper piece 32b6 is inserted into the stopper hole 32a1 while the stopper piece 32b6 is pressed inwardly in the directions of the diameter by a peripheral wall surface of the stopper piece 32a1. Thus, the metal-made plate 32a is attached to the resin-made knob 32b as shown in FIG. 16.

The stopper pieces 32b6 inserted in the stopper holes 32a1 tend to restore the original posture and therefore press the peripheral wall surfaces of the stopper holes 32a1. Therefore, the metal-made plate 32a can be prevented from clattering due to the force of engagement between the stopper pieces 32b6 and the stopper holes 32a1.

Figure 17:
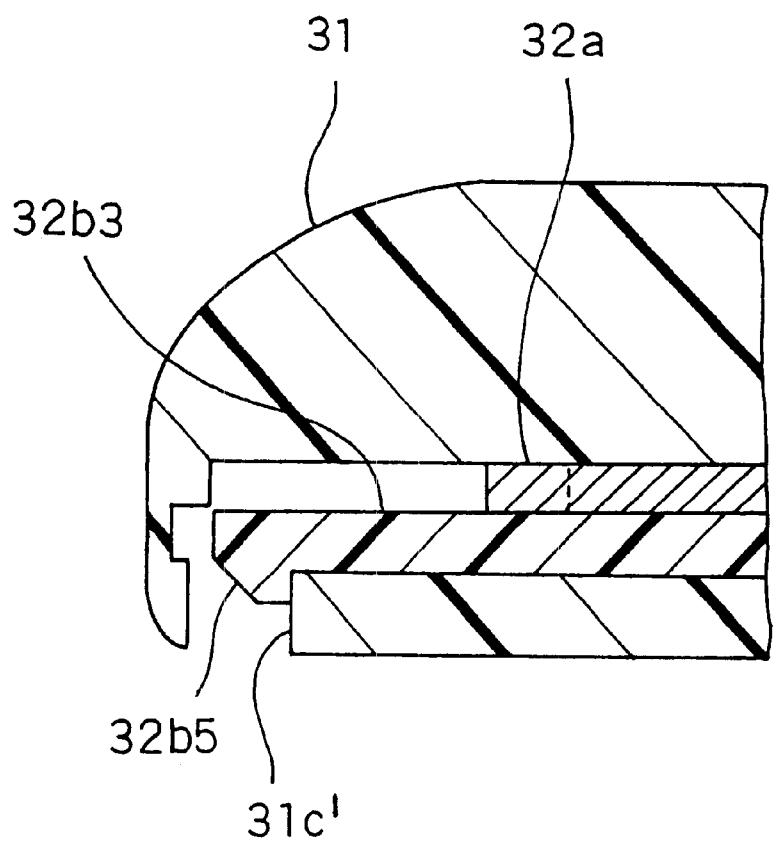
FIG. 17 is a fragmental sectional view showing a shape of an engagement groove according to a modification.

In this embodiment, the engagement groove 31c penetrates from the deeply inward portion of the lock piece retaining hole 31b to a side, as shown in FIG. 12. However, the engagement groove 31c needs merely to stop at least the wedge-shaped protrusion 32b5 formed on the resin-made knob 32b and receive the wedge-shaped protrusion 32b5 so that the wedge-shaped protrusion 32b5 can be moved in substantially horizontal directions. As shown in FIG. 17, an engagement groove 31c may penetrate downward, so that the opening of the engagement groove 31c is formed at a location that is hard to be seen by a user.

Furthermore, the metal-made plate 32a having a generally rectangular shape is attached to the resin-made knob 32b in order to reduce the amount of metal plates used. However, a requirement is merely to secure a lock portion that is receivable in and engageable with the height adjustment grooves 21a. For example, it is also possible to use a metal-made plate having a frame shape, an L-like shape, a squared letter "U" shape, etc.

A case where the metal-made plate 32a has a frame shape will be described with reference to FIGS. 18 to 25.

Figure 18:
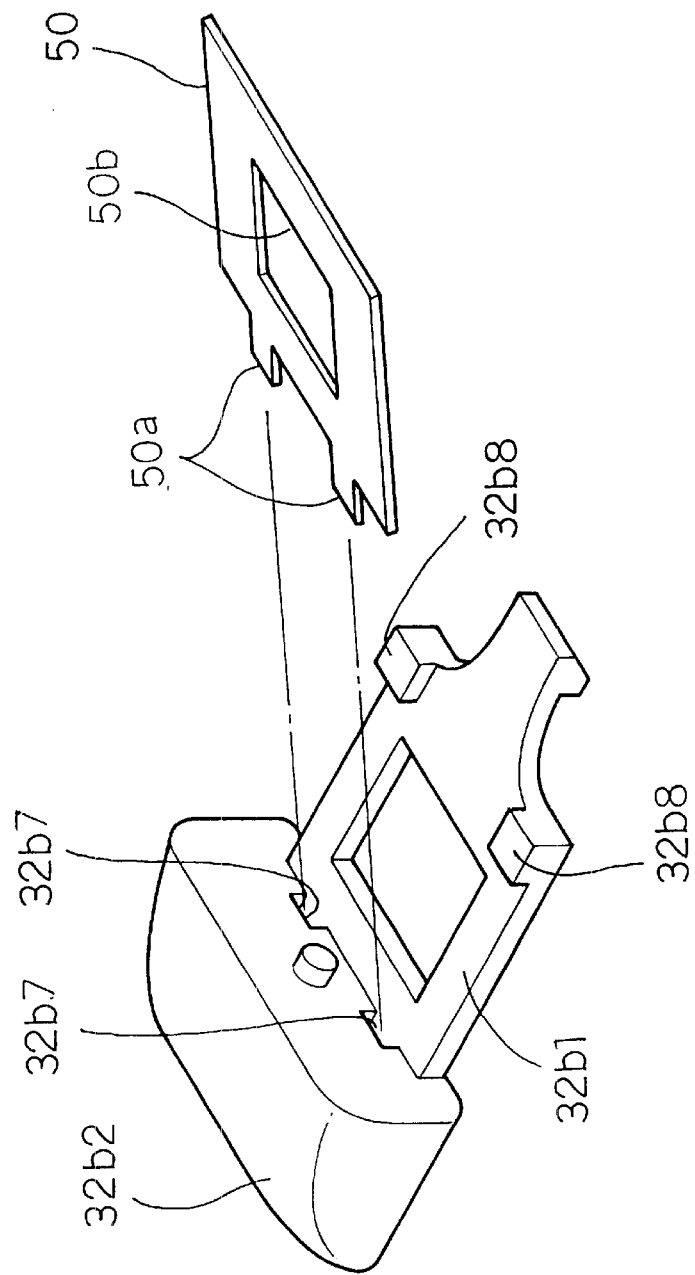
FIG. 18 is a perspective view showing a state before a metal-made plate according to the modification is attached to the resin-made knob.
Figure 19:
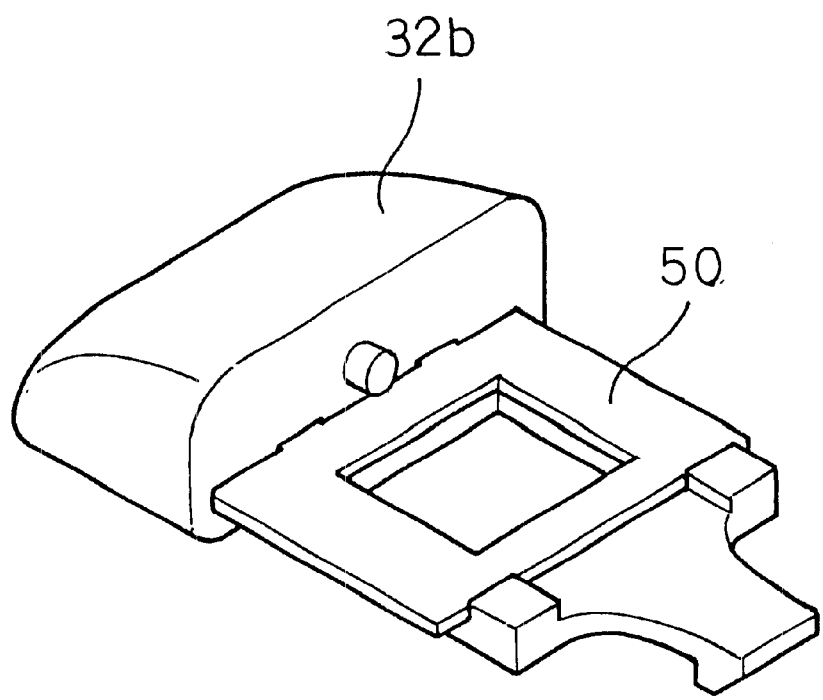
FIG. 19 is a perspective view showing a state after the metal-made plate has: been attached to the resin-made knob.

As shown in FIGS. 18 and 19, a metal-made plate 50 is formed by a frame body that has a through-hole to avoid interference with the headrest stay 21 and that has a width greater than that of the resin-made knob 32b. The metal-made plate 50 has mounting pieces 50a, 50a that are protruded leftwards from a left side surface of the metal-made plate 50.

The metal-made plate 50 locks the headrest stay 21 by engaging a right-side edge portion 50b of the through-hole with a desired height adjustment groove 21a.

On the other hand, the resin-made knob 32b has a frame portion 32b1 that has a through-hole as in the metal-made plate 50, and an operating portion 32b2 that is integrally formed on a left side end of the frame portion 32b1. A right-side wall face of the operating portion 32b2 has mounting holes 32b7, 32b7 in which the mounting pieces 50a, 50a can be inserted. Two right-side corners of the frame portion 32b1 are provided with stopper pieces 32b8, 32b8 protruded upwards.

Due to this construction, the metal-made plate 50 is attached to the resin-made knob 32b by engaging right-side ends of the metal-made plate 50 with the stopper pieces 32b8, 32b8 from a left side while inserting the mounting pieces 50a, 50a into the mounting holes 32b7, 32b7.

Figure 20:
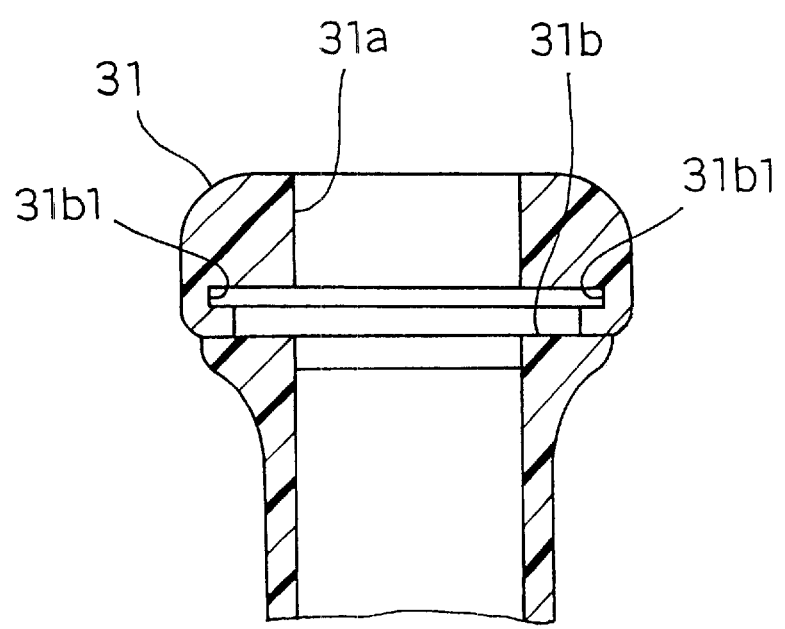
FIG. 20 is a sectional view showing an internal construction of the headrest support.

Then, as shown in FIG. 20, the lock piece is inserted deeply into the lock piece retaining hole 31b, with side end portions of the metal-made plate 50 being received by slide grooves 31b1, 31b1 that are formed horizontally in two side walls of the lock piece retaining hole 31b.

Figure 21:
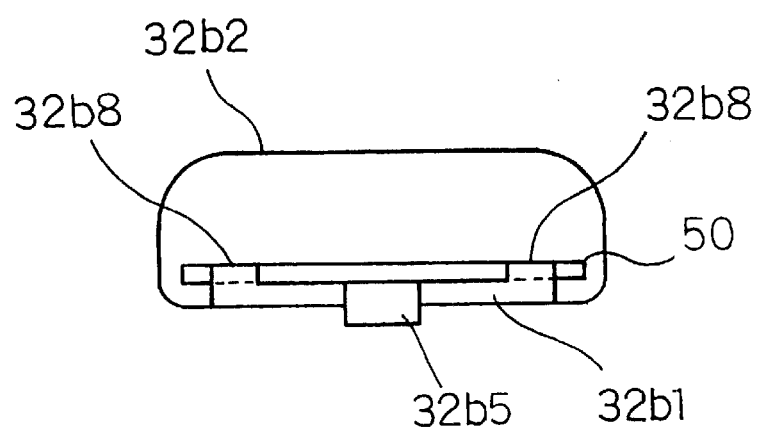
FIG. 21 is a front view showing a construction of a lock piece where a widened metal-made plate is applied.
Figure 22:
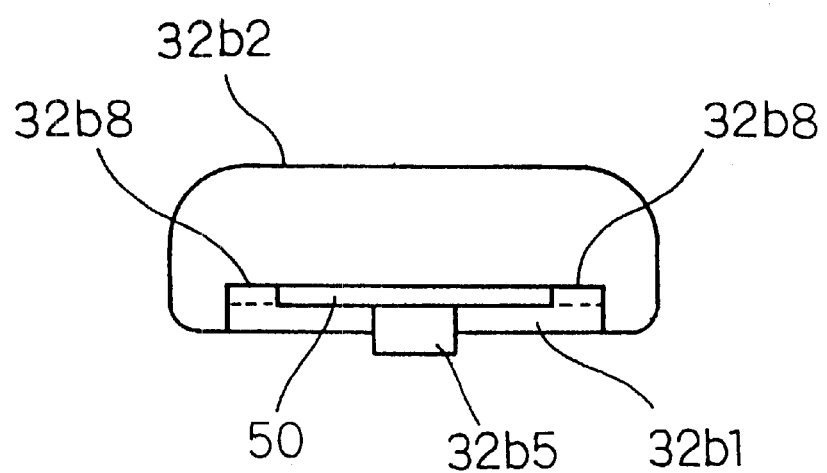
FIG. 22 is a front view showing a construction a lockpiece where a metal-made plate having a width equal to that of the resin-made knob is applied.

In this case, the metal-made plate 50 having an increased width is attached to the resin-made knob 32b, and the side end portions of the metal-made plate 50 are guided by the slide grooves 31b1, 31b1, as shown in FIG. 21. However, it is not necessary to increase the width of the metal-made plate 50 alone for the guiding operation. It is also possible to provide the metal-made plate 50 and the resin-made knob 32b with equal widths as shown in FIG. 22 so that the lock piece 32 is guided by the entire lock piece retaining hole 31b.

As in the foregoing embodiment, an engagement structure is formed between the tube body 31 and the lock piece 32 in order to restrict the movable range of the lock piece 32 and prevent the lock piece 32 from falling apart from the tube body 31 when the lock piece 32 is inserted in the lock piece retaining hole 31b.

The lock piece retaining hole 31b has a vertical width that is approximately equal to a sum of the thickness of the metal-made plate 50 and the thickness of the frame portion 32b1.

Due to this construction, when the wedge-shaped protrusion 32b5 is directed toward the opening of the lock piece retaining hole 31b and the lock piece 32 is inserted into the lock piece retaining hole 31b, a right-side end of the wedge-shaped protrusion 32b5 interferes with the opening of the lock piece retaining hole 31b.

Figure 23:
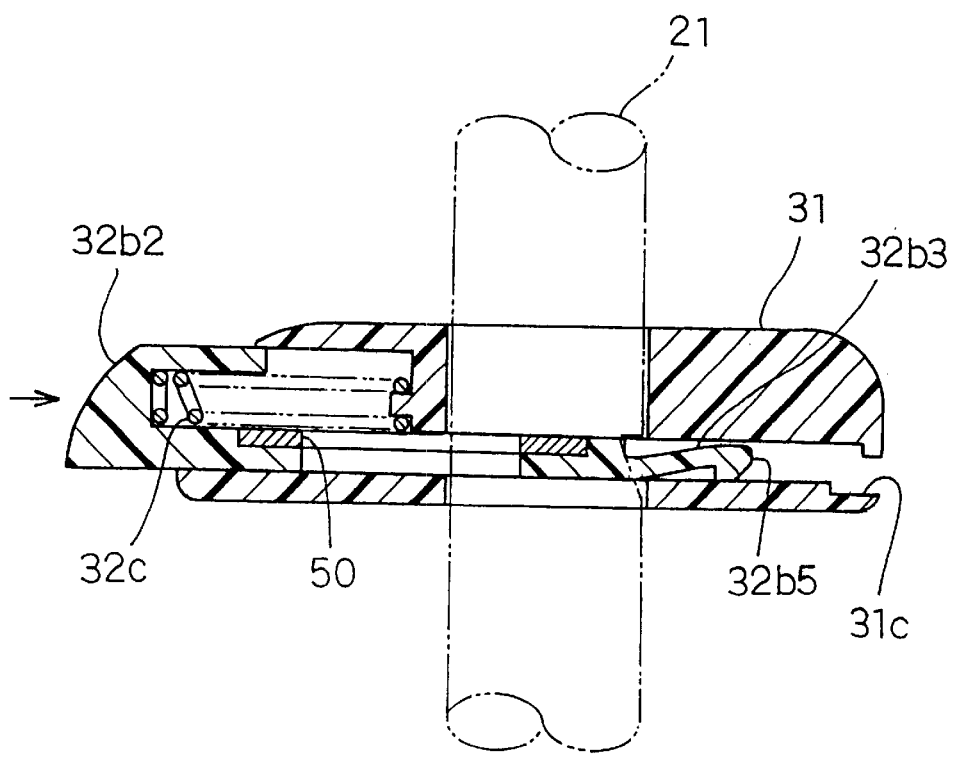
FIG. 23 is a sectional view showing a state during insertion of the lock piece into a lock piece retaining hole.

Then, as shown in FIG. 23, the flexible arm 32b3 is bent so as to displace the wedge-shaped protrusion 32b5 upwards as the lock piece 32 is inserted deeply into the lock piece retaining hole 31b.

Figure 24:
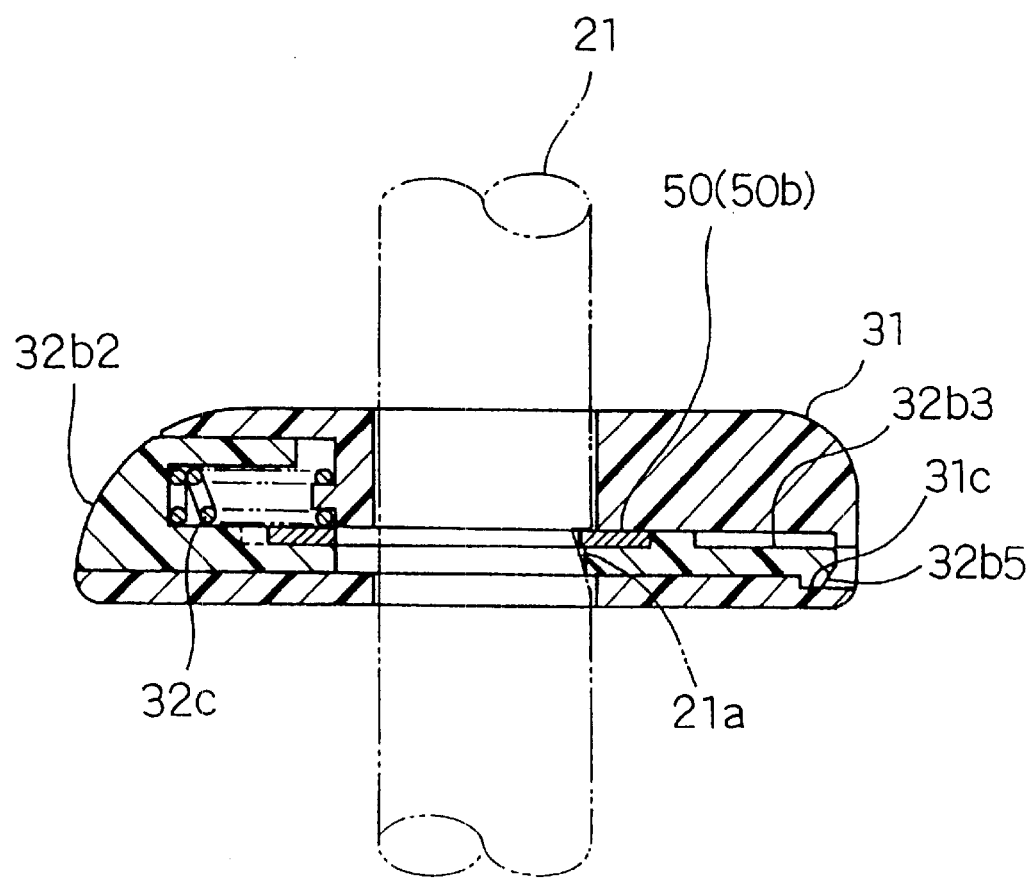
FIG. 24 is a sectional view showing a position of the lock piece during a normal state.

When the lock piece 32 is inserted further deeply into the lock piece retaining hole 31b so that the wedge-shaped protrusion 32b5 reaches the engagement groove 31c, the wedge-shaped protrusion 32b5 is received by the engagement groove 31c and the bending of the flexible arm 32b3 is removed, as shown in FIG. 24.

If an attempt is made to pull the lock piece 32 leftwards from the lock piece retaining hole 31b, the wedge-shaped protrusion 32b5 contacts the engagement groove 31c, so that the movement of the wedge-shaped protrusion 32b5 to the left is restricted and the lock piece 32 continues to be retained by the lock piece retaining hole 31b. Thus, the lock piece 32 is prevented from falling apart from the tube body 31.

As shown in the drawing, since the lock piece 32 is inserted in the lock piece retaining hole 31b with the spring 32c disposed between a right-side wall surface of the operating portion 32b2 and the opening of the lock piece retaining hole 31b, the lock piece 32 is urged leftwards. Therefore, normally, the wedge-shaped protrusion 32b5 is pressed against a left-side wall surface of the engagement groove 31c when the wedge-shaped protrusion 32b5 is retained within the tube body 31.

Therefore, if in this situation, a height adjustment groove 21a is adjusted to the position that faces the right-side edge portion 50b of the metal-made plate 50, the right-side edge portion 50b engages with the height adjustment groove 21a, thereby locking the headrest stay 21.

Figure 25:
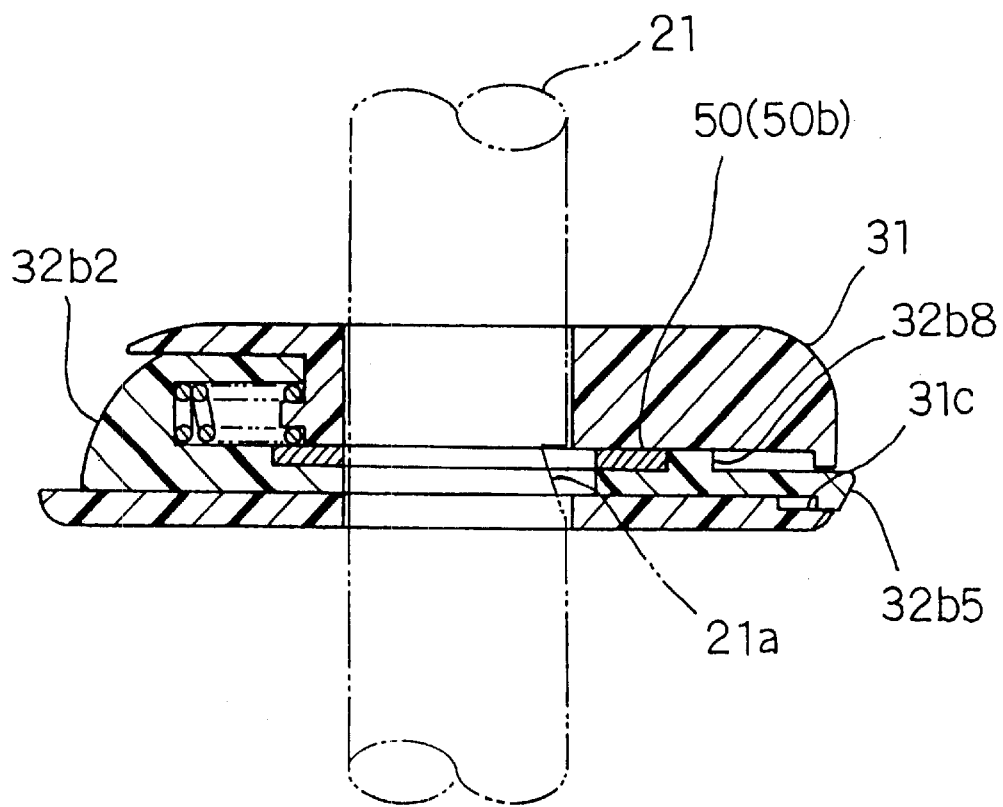
FIG. 25 is a sectional view showing a position of the lock piece when an operating portion is pressed.

If a user presses the operating portion 32b2 rightwards, the wedge-shaped protrusion 32b5 is moved rightwards within the engagement groove 31c as shown in FIG. 25, so that the right-side edge portion 32a2 withdraws from the height adjustment groove 21a and the headrest stay 21 becomes movable up and down.

When the operating portion 32b2 is released, the lock piece 32 is returned leftwards until the wedge-shaped protrusion 32b5 contacts the left-side wall surface of the engagement groove 31c, due to the spring 32c urging the lock piece 32 leftwards.

As a result, the right-side edge portion 50b engages with the height adjustment groove 21a again as shown in FIG. 24, thereby locking the headrest stay 21 with the tube body 31.

Figure 26:
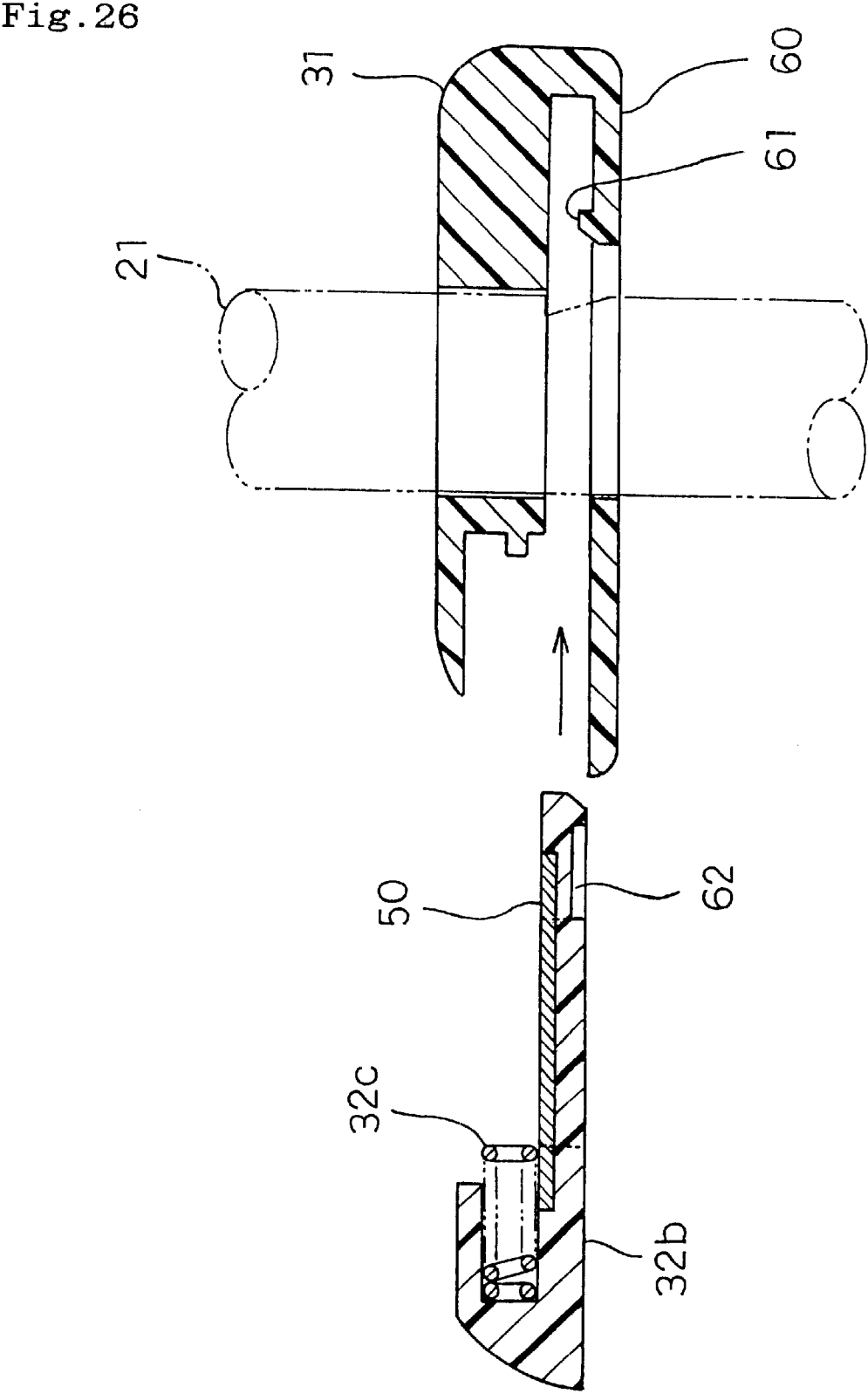
FIG. 26 is a sectional view showing a state before a lock piece according to a modification is inserted into a lock piece retaining hole.

Although in the foregoing description, the flexible arm 32b3 and the wedge-shaped protrusion 32b5 are formed on the side of the resin-made knob 32b, and the engagement groove 31c is formed on the side of the tube body 31, this construction is merely an example of the engagement structure. It is also possible to form a flexible arm 60 and a wedge-shaped protrusion 61 on the side of the tube body 31 and to form an engagement groove 62 on the side of the resin-made knob 32b as shown in FIG. 26.

Due to this construction, when the lock piece 32 is inserted into the lock piece retaining hole 31b, a left-side end of the wedge-shaped protrusion 61 interferes with a right-side end of the resin-made knob 32b.

Figure 27:
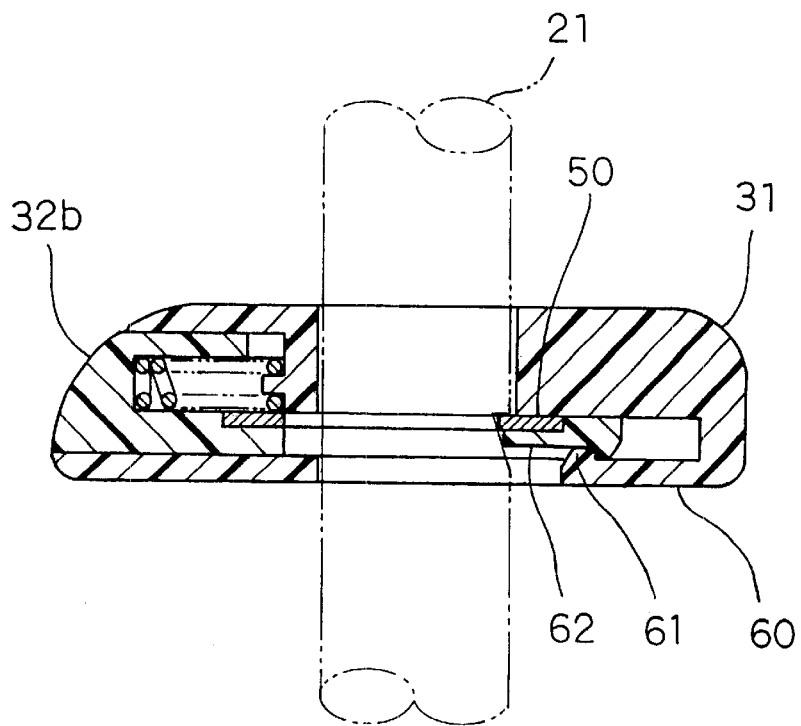
FIG. 27 is a sectional view showing a state after the lock piece has been inserted in the lock piece retaining hole.

Then, the resin-made knob 32b moves over the wedge-shaped protrusion 61, with the flexible arm 60 being bent. The wedge-shaped protrusion 61 is subsequently received in the engagement groove 62 as shown in FIG. 27.

Therefore, even if an attempt is made to pull the lock piece 32 leftwards out of the lock piece retaining hole 31b, leftward movement of the wedge-shaped protrusion 61 is restricted.

Figure 28:
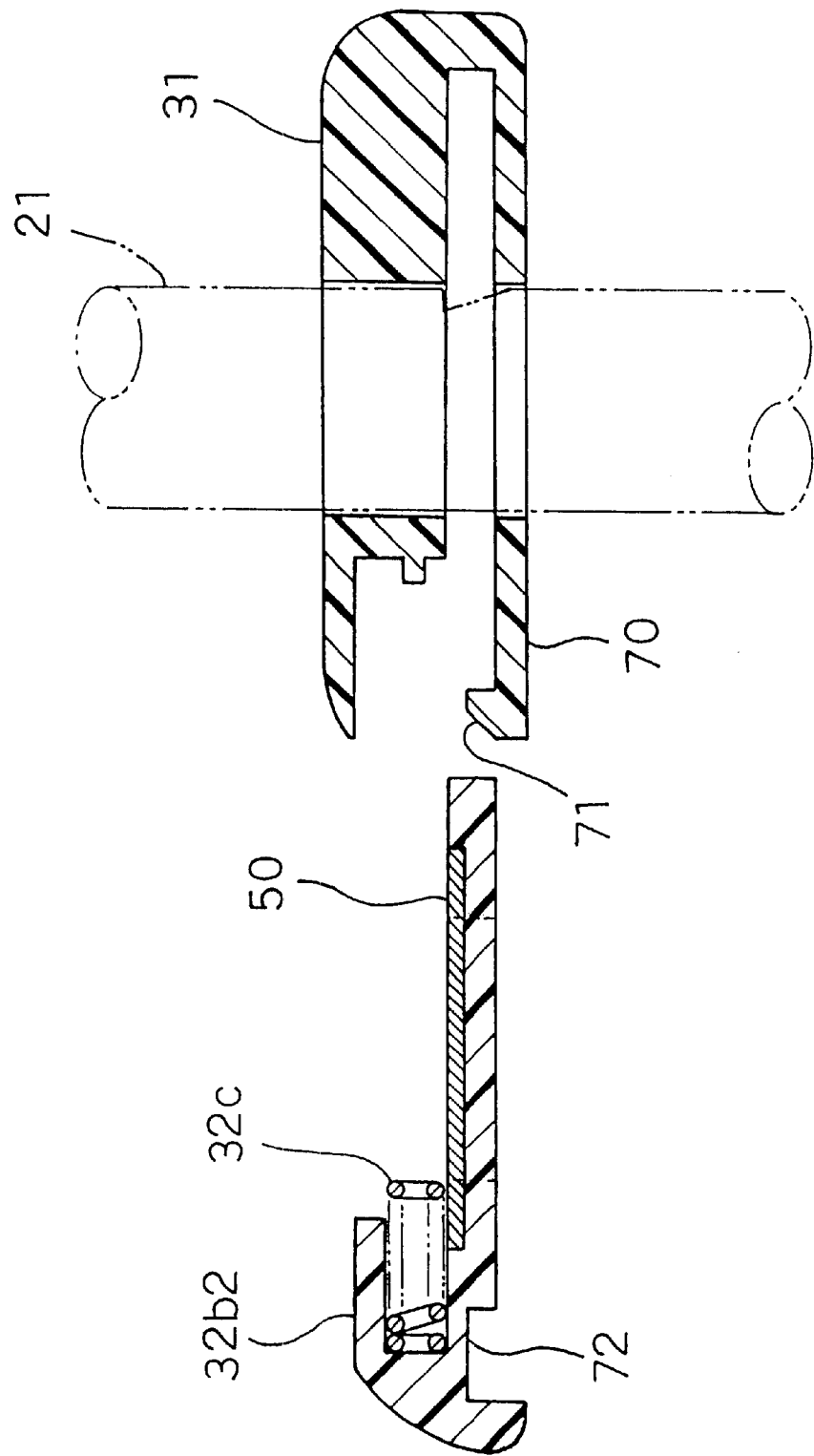
FIG. 28 is a sectional view showing a state before a lock piece according to another modification is inserted into a lock piece retaining hole.
Figure 29:
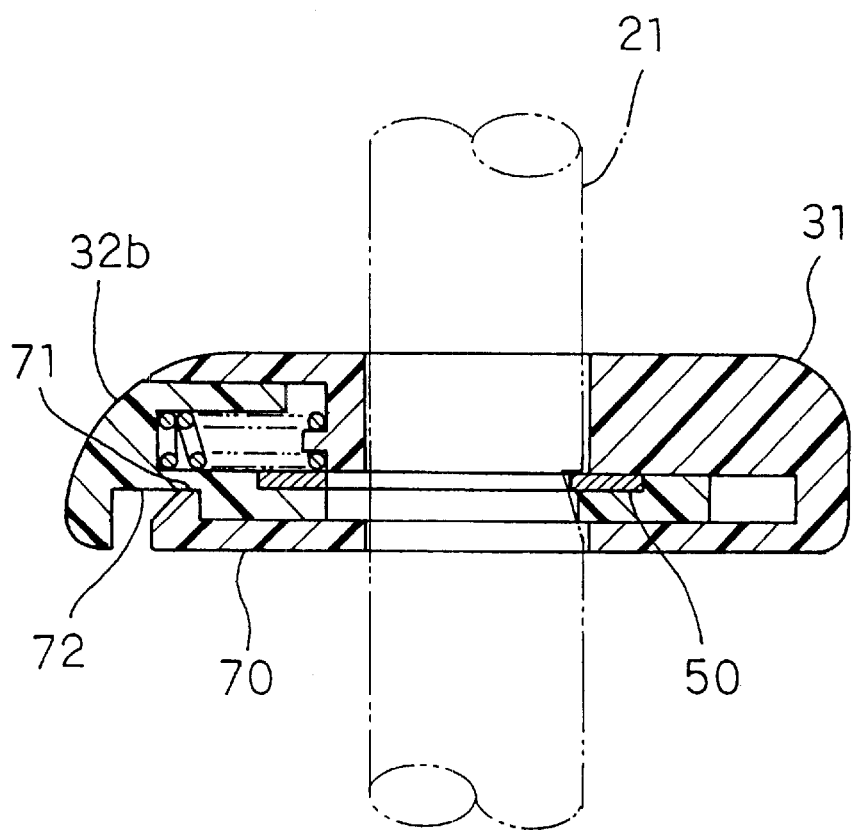
FIG. 29 is a sectional view showing a state after the lock piece has been inserted in the lock piece retaining hole.

Furthermore, it is also possible to form a flexible arm 70 and a wedge-shaped protrusion 71 formed at the side of the opening of the lock piece retaining hole 31b and to form an engagement groove 72 on the side of the operating portion 32b2 formed on the resin-made knob 32b as shown in FIG. 28 so that the wedge-shaped protrusion 71 and the engagement groove 72 can be engaged as shown in FIG. 29.

Although the engagement structure has been described in conjunction with the metal-made plate 50, it is also possible to apply the metal-made plate 32a of the embodiment in a similar manner.

Figure 30:
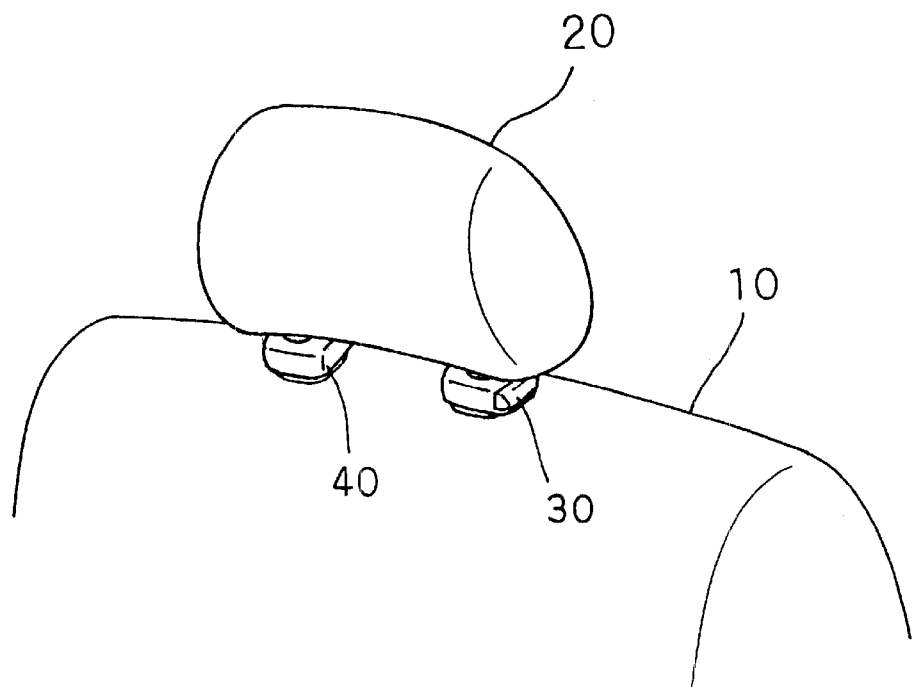
FIG. 30 is a perspective view showing a situation when the headrest has been pushed down to a side of a seatback.

If the headrest 20 is too high for a user, the headrest 20 must be pushed down toward the seatback 10 for use as shown. in FIG. 30.

In this case, the operating portion 32b2, which is pressed in order to change the height of the headrest 20, is positioned in a narrow gap formed between the headrest 20 and the seatback 10.

Therefore, no height adjustment groove 21a is formed at a position that faces the metal-made plate 32a in this situation so that the height of the headrest 20 can be changed even if a user's finger cannot reach the operating portion 32b2 when the height is to be changed.

However, if there is no structure for restricting movement of the headrest stay 21 in the directions of the axis thereof when the headrest 20 is used at a position where the headrest 20 is pushed down to the side of the seatback 10, the seatback 10 may move up and down and may change in height, for example, when a driver performs braking. Therefore, besides the engagement structure formed by the metal-made plate 32a and the height adjustment groove 21a, it is also possible to provide a tentative engagement structure for restricting movement of the headrest stay 21 in the directions of the axis thereof only when the headrest 20 is used at the position where the headrest 20 is pushed down to the side of the seatback 10.

Figure 31:
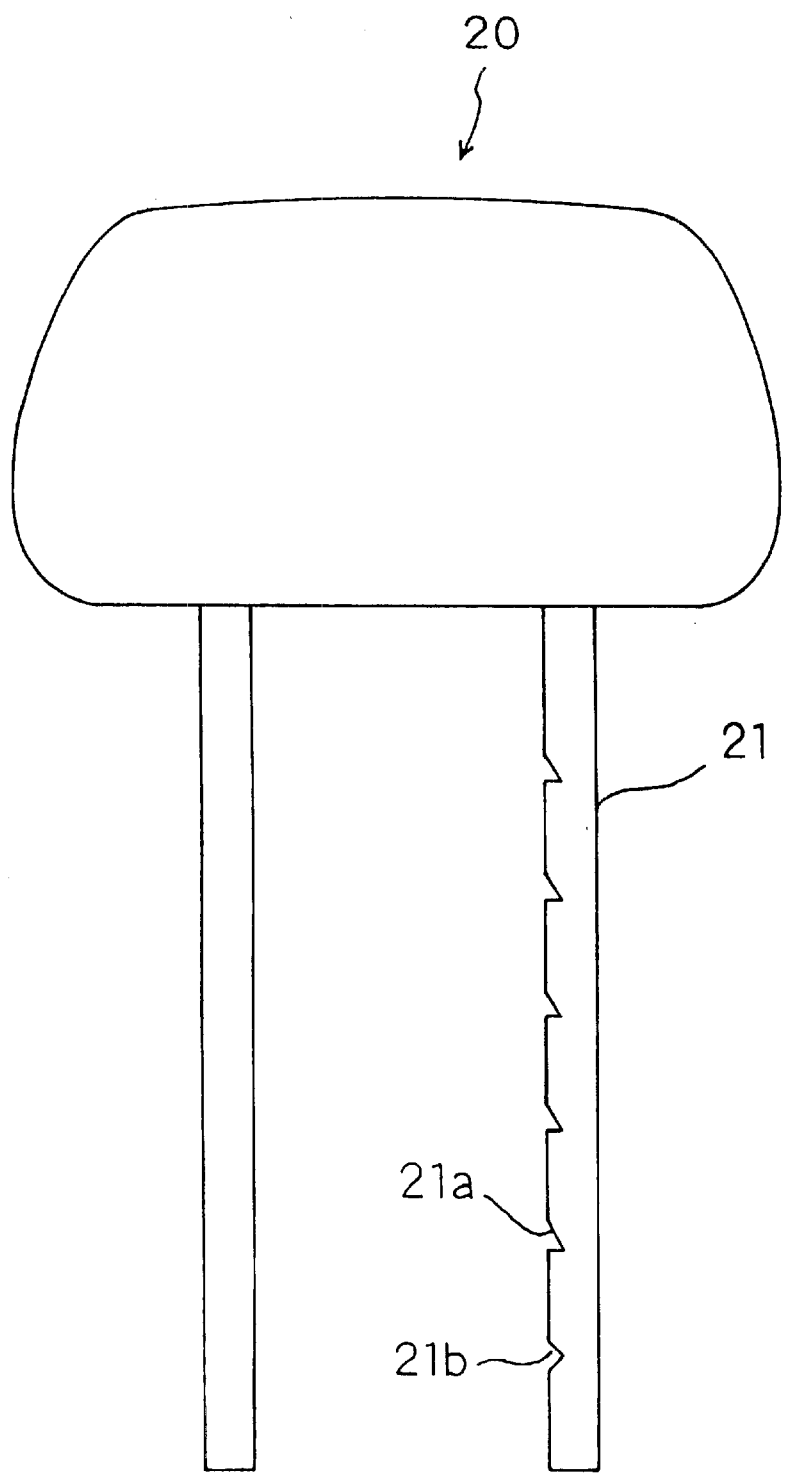
FIG. 31 is a plan view showing a headrest stay with a tentative engagement groove formed thereon.

As shown in FIG. 31, this tentative engagement structure is made up of a tentative engagement groove 21b formed below the height adjustment grooves 21a arranged on the headrest stay 21, and a not-shown tentative engagement portion that is formed on a peripheral surface of the tube body 31. When the headrest stay 21 is inserted deeply into the tube body 31 so that the lower end of the headrest 20 is pressed against the upper end of the tube body 31, the tentative engagement portion tentatively engages with the tentative engagement groove 21b, thereby locking the headrest stay 21 and restricting up-down movements thereof.

As shown in the drawing, each height adjustment groove 21a has an upper surface that is formed substantially horizontally, so that when engaged with the metal-made plate 32a, the height adjustment groove 21a restricts downward movement of the headrest stay 21. On the other hand, the tentative engagement groove 21b has a lower surface that is formed substantially horizontally, so that when engaged with the tentative engagement portion, the tentative engagement groove 21b restricts upward movement of the headrest stay 21.

The tentative engagement structure is designed so that upward movement of the headrest stay 21 is restricted if there occurs force of a magnitude that is approximately equal to or less than forces applied to the vehicle at the time of braking or the like, and so that when a user applies a force to pull up the headrest 20, the tentative engagement groove 21b is guided upwards to allow a change in the height of the headrest 20.

Figure 32:
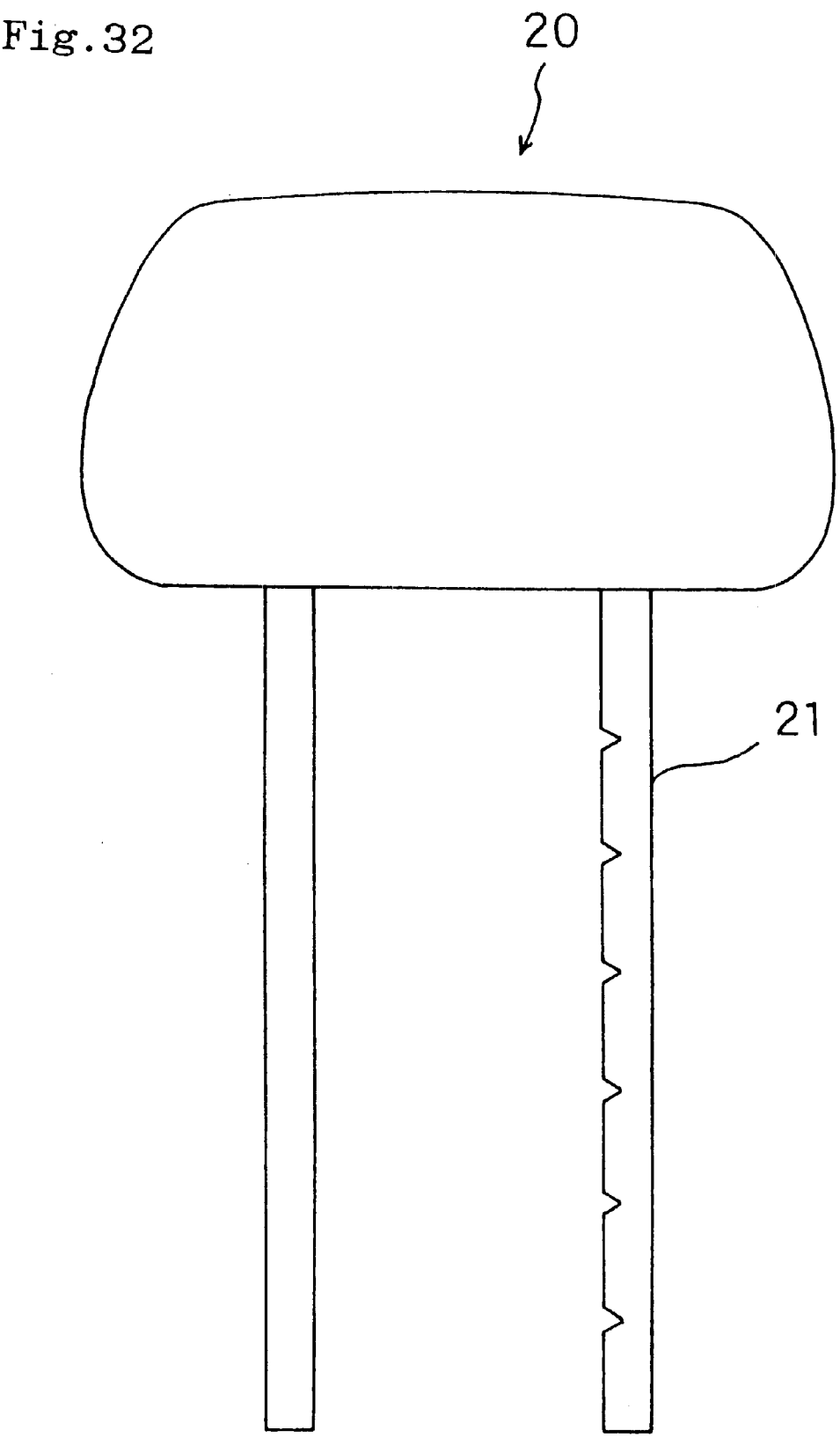
FIG. 32 is a plan view showing a headrest stay wherein height adjustment grooves and a tentative engagement groove are formed in the same shape.

Furthermore, as shown in FIG. 32, it is also possible to eliminate the differences between the height adjustment grooves 21a and the tentative engagement groove 21b so that all the grooves formed in the side surface of the headrest stay 21 have identical shapes.

The shape of the grooves shown in the drawing is a mere example, and is not restrictive. It is also possible to form a tentative engagement groove so as to have a shape identical to the shape of the height adjustment grooves 21a shown in FIG. 31. It is also possible to form height adjustment grooves so as to have a shape identical to that of the tentative engagement groove 21b shown in the drawing.

Figure 33:
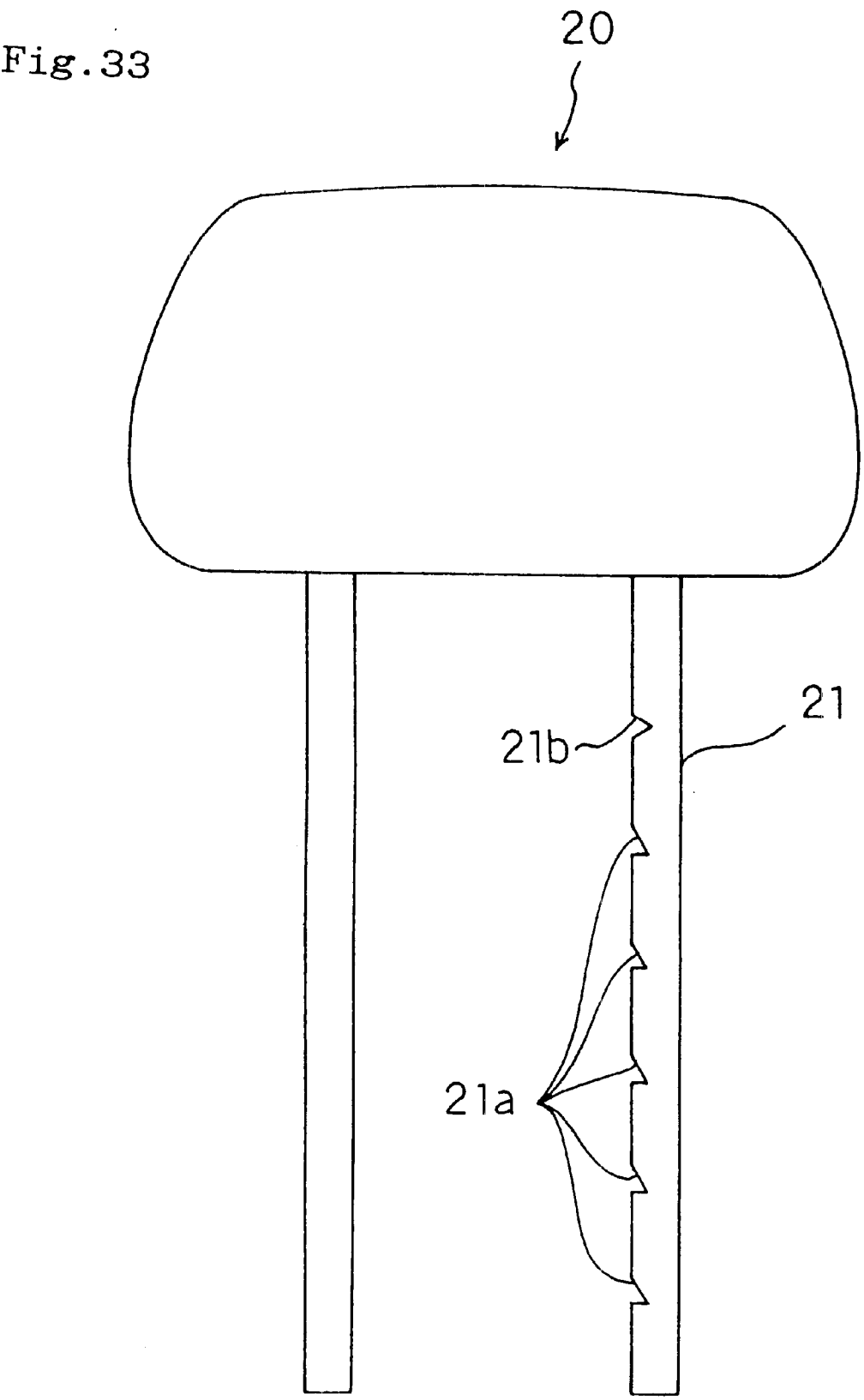
FIG. 33 is a plan view showing a headrest stay with a tentative engagement formed at a base end side.
Figure 34:
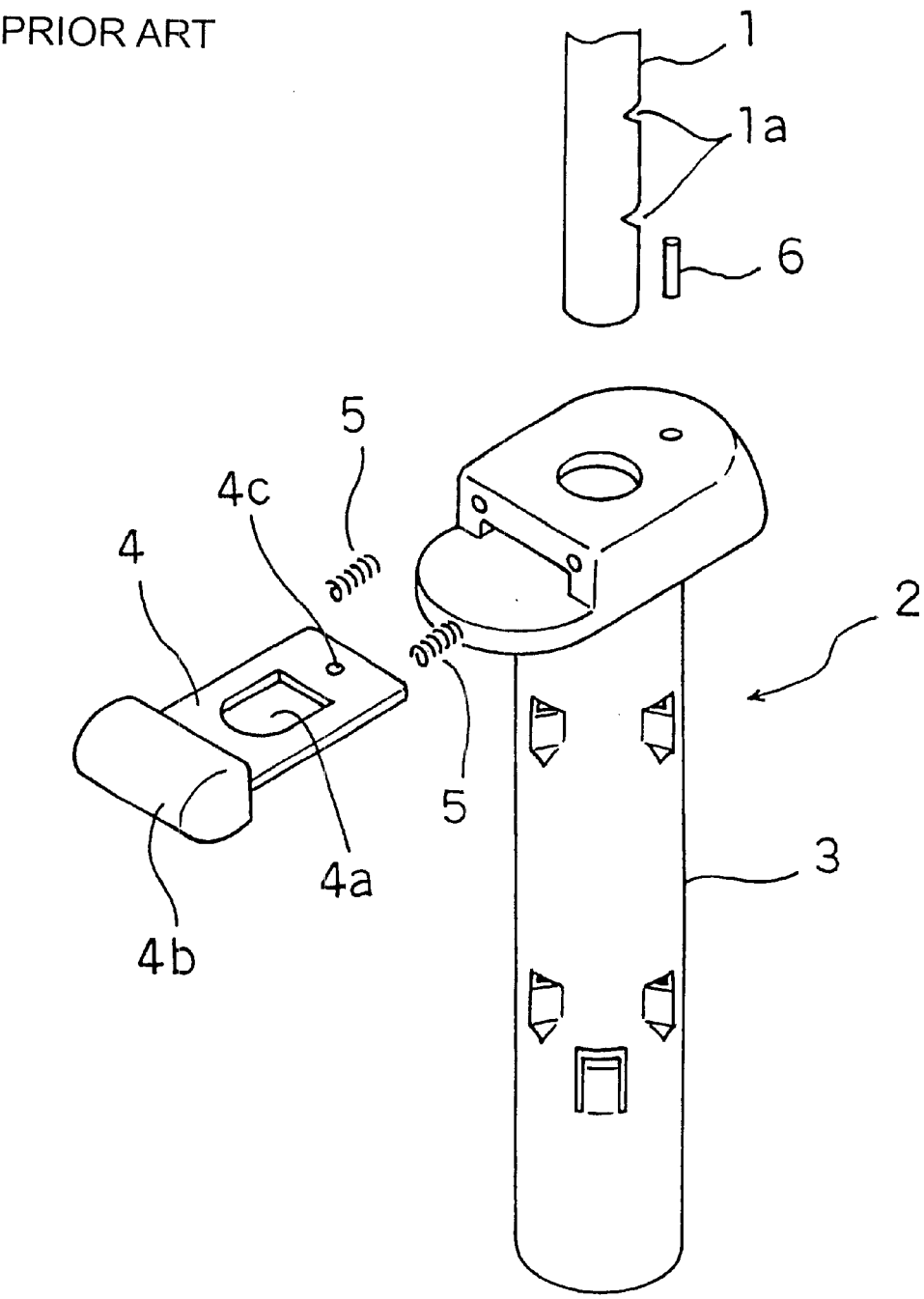
FIG. 34 is a perspective view showing a construction of a headrest support according to a conventional art.

Furthermore, in this embodiment, the tentative engagement portion formed separately from the metal-made plate 32a of the lock piece 32 is used for the tentative engagement. However, as shown in FIG. 33, it is also possible to form a tentative engagement groove 21b at a base end side of the headrest stay 21 and to tentatively engage the tentative engagement groove 21b with the metal-made plate 32a.

That is, if the shape of the tentative engagement groove 21b is set such that upward movement of the headrest stay 21 is restricted if there occurs force of a magnitude that is approximately equal to or less than forces applied to the vehicle at the time of braking or the like, and such that when a user applies a force to pull up the headrest 20, the tentatively engaged state is discontinued to allow a change in the height of the headrest 20, it is possible to cause the lock piece 32 to function as a tentative engagement structure similarly to the engagement portion.

Thus, it becomes possible to provide a headrest support 30 that absorbs impact occurring on the headrest 20 in the direction of height thereof by means of the spring structure 33a formed vertically downward from a lower side of the lock piece retaining hole 31b, and that prevents the clattering of the tube body 31 relative to the receptacle tube 12 while having sufficient strength by means of the resin-made springs 35 formed between the cutout grooves extending in the outer peripheral surface of the tube body 31 substantially parallel in the up-down direction, and that can easily be assembled by the lock piece 32, the tube body 31 and the spring 32c.

Industrial Applicability

As described above, the invention is able to provide a headrest support capable of absorbing impact occurring to the headrest in the direction of the height.

Furthermore, according to the invention in accordance with claim 2, it is possible to provide a headrest support capable of preventing the clattering of the tube body relative to the receptacle tube by using a resin-made spring that has sufficient strength.

Still further, according to the invention in accordance with claim 3, it is possible to provide a headrest support that allows an improvement in assembly workability.

What is claimed is:

1. A headrest support comprising:

a tube body that is inserted into and supported by a receptacle tube disposed in a seatback, and that retains a headrest stay inserted therein, and that allows an adjustment of a height of the headrest stay; and a spring structure that is protruded from a distal end side of the tube body toward an opening end portion of the receptacle tube, and that urges the distal end side of the tube body to move away from the opening end portion of the receptacle tube when the tube body is pushed down to a side of the receptacle tube, wherein said spring structure includes a ring portion that is deformable in a substantially vertical direction, and said spring structure is disposed below a lock piece retaining hole of the tube body that receives a lock piece for engaging with the headrest stay.

2. A headrest support comprising:

a tube body that is inserted into and supported by a receptacle tube disposed in a seatback, and that retains a headrest stay inserted therein, and that allows an adjustment of a height of the headrest stay; and a resin-made spring including a flexible portion that is formed between cutout grooves extending in an outer peripheral surface of the tube body substantially parallel in a direction of an axis of the tube body, and that has a flexibility substantially in a direction of a diameter of the tube body, and a protrusion that is protruded outwards from the flexible portion, and that presses an inner peripheral surface of the receptacle tube while bending the flexible portion inwards when the tube body is inserted in the receptacle tube.

3. A headrest support comprising:

a lock piece having a lock nail disposed at a position that faces a height adjustment groove formed on a side face of a headrest stay;

a tube body having a retaining hole capable of retaining the headrest stay while orienting the headrest stay in a direction of an axis thereof, and a lock piece retaining hole that allows the lock piece to be inserted thereinto from a side opposite from the height adjustment groove, and that allows the lock nail to be advanced and withdrawn in a direction of insertion;

an engagement structure that engages the lock piece and the tube body with each other and restricts a movement of the lock nail from a position of locking with the height adjustment groove toward an opening of the lock piece retaining hole; and a spring structure that presses the lock piece disposed in the lock piece retaining hole from a side of the lock nail to the headrest stay, wherein the engagement structure includes a flexible arm disposed on the lock nail, having a wedge shaped protrusion at an end thereof, and wherein the lock piece retaining hole has an engagement groove for receiving the wedge shaped protrusion of the lock nail, and wherein the lock piece includes a frame portion and a metal plate disposed on the frame portion, and the frame portion has a protrusion that engages with a hole of the metal plate.

* * * * *